(12) United States Patent
Kerr

(10) Patent No.: US 7,860,272 B2
(45) Date of Patent: Dec. 28, 2010

(54) MOTION CHARACTERISATION

(75) Inventor: Julian Lewis Kerr, Hokkaido (JP)

(73) Assignee: Canon Information Systems Research Australia Pty. Ltd., North Ryde, New South Wales (AU)

( * ) Notice: Subject to any disclaimer, the term of this patent is extended or adjusted under 35 U.S.C. 154(b) by 951 days.

(21) Appl. No.: 11/689,269

(22) Filed: Mar. 21, 2007

(65) Prior Publication Data

US 2007/0223808 A1 Sep. 27, 2007

(30) Foreign Application Priority Data

Mar. 23, 2006 (AU) .............................. 2006201210

(51) Int. Cl.
*G06K 9/00* (2006.01)
(52) U.S. Cl. ...................... 382/103; 382/107; 382/155; 706/12; 706/14; 706/16; 706/20; 700/47; 700/48
(58) Field of Classification Search ................ 382/103, 382/107, 155; 706/12, 14, 16, 20; 700/47, 700/48
See application file for complete search history.

(56) References Cited

U.S. PATENT DOCUMENTS

| | | | | |
|---|---|---|---|---|
| 5,231,483 A * | 7/1993 | Sieber et al. | ................. | 348/169 |
| 5,323,470 A * | 6/1994 | Kara et al. | ................... | 382/103 |
| 5,717,463 A * | 2/1998 | Brailean et al. | ........ | 375/240.12 |
| 5,726,713 A * | 3/1998 | Panis | ..................... | 375/240.14 |
| 6,757,571 B1 * | 6/2004 | Toyama | ........................ | 700/47 |
| 7,565,340 B2 * | 7/2009 | Herlocker et al. | ............. | 706/52 |
| 7,675,543 B2 * | 3/2010 | Jain et al. | .................... | 348/169 |

* cited by examiner

*Primary Examiner*—John B Strege
(74) *Attorney, Agent, or Firm*—Fitzpatrick, Cella, Harper & Scinto

(57) ABSTRACT

A method for configuring a machine learning model for use in a motion characterisation process. The method comprises, in a processing system, acquiring user characterisations for respective portions of at least one video sequence and configuring the model using the user characterisations and at least one property associated with the respective portions. Any inconsistency in the user characterisations is then determined, using the model, with an indication of the inconsistency being displayed. This allows the user to select at least one option for addressing the inconsistency, with the model being reconfigured based on the selected at least one option.

22 Claims, 18 Drawing Sheets

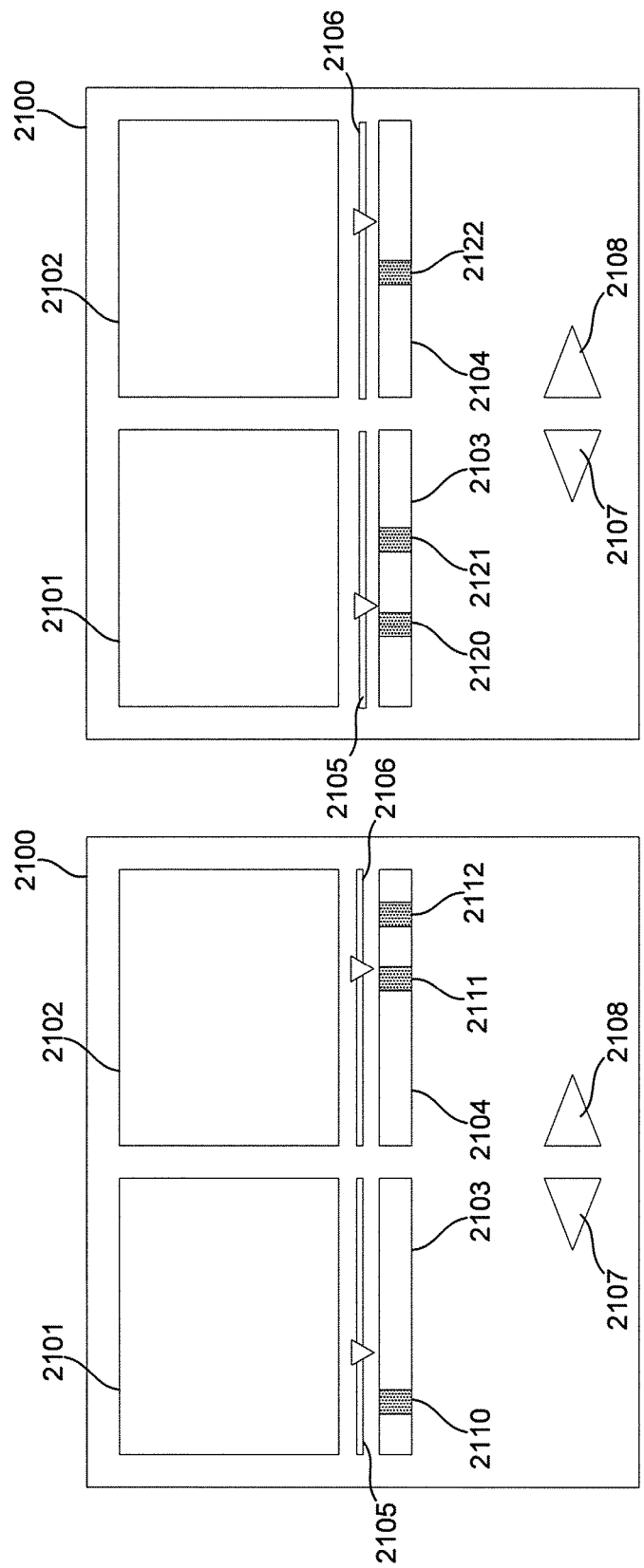

MOTION CHARACTERISATION

FIELD OF THE INVENTION

The present invention relates to a method and apparatus for configuring a machine learning model for use in a motion characterisation process, and in particular to a method and apparatus for training a motion characteriser for characterising motion present in a sequence of images.

DESCRIPTION OF THE BACKGROUND ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

Automated characterisers are adapted to review and automatically characterise content. This can include, for example, reviewing sequences of images, such as full motion video, to detect sequences of frames in which motion occurs. This may be used for example in recording the output of security cameras, or the like.

Generally such characterisers must be configured in order to characterise content according to a user's preferences. Currently there are three main techniques for performing such configuration.

In one technique a user adjusts the value of one or more characterisation parameters. Thus, in the case of motion characterisation, one commonly employed parameter is a sensitivity threshold, whereby a pixel in a video image is considered to be 'in motion' if its frame-by-frame variation exceeds the sensitivity threshold. Other parameters that can be used include an area-ratio threshold, whereby a frame is considered to be 'in motion' if the proportion of its pixels that are 'in motion' exceeds the specified area-ratio threshold, and a duration threshold, whereby a motion alert is triggered if the number of adjacent frames that are 'in motion' cover a period of time that exceeds the specified duration threshold.

However, allowing a user to adjust the value of motion characterisation parameters has a number of significant weaknesses. Firstly, the user cannot readily anticipate the effect of changing one of the parameter values. Consequently, the user must employ trial and error to configure the automatic motion characteriser, which is typically time consuming. Secondly, the achievable range of motion characterisation behaviours is limited, as a user is only capable of adjusting a small number of motion characterisation parameters. A third limitation of commonly employed schemes is that motion characterisation parameter values appropriate for a particular ambient lighting condition may not be appropriate if the ambient lighting conditions were to change. Consequently, the automatic motion characteriser may not be suitable for use outdoors, where the lighting conditions may change.

A second technique for configuring an automatic characteriser is to employ a form of unsupervised 'machine learning'. Systems based on this methodology are configured without human intervention. A typical strategy is to build a statistical model for each pixel in a video image based on how the pixel changes over time. When applied to characterising motion in video, a pixel in a video image is considered to be 'in motion' if the pixel value falls outside the range of values predicted by the generated statistical model of the pixel. A motion alert is triggered if a frame has an unusually high number of pixels that are 'in motion'.

The methodology for configuring an automatic motion characteriser with unsupervised machine learning has two significant weaknesses. Firstly, a user is unable to instil particular desired motion characterisation behaviour into the system. This may render systems based on this methodology unfit for use in certain operating environments. A second weakness of this methodology is that it typically requires significant computational resources, thereby making it unsuitable for use in embedded systems, or in the common setting where a single computer is required to simultaneously monitor a large number of cameras in real time.

A third technique is to employ supervised machine learning. In this example, a machine learning algorithm is trained on a set of examples that demonstrate desired motion characterisation behaviours. Thus, for example, the machine learning system is trained on examples of video that should be characterised as movement of interest. A user of such a system is responsible for selecting the training examples provided to the system, and for selecting the values of machine learning algorithm parameters.

However, configuring an automatic motion characteriser with supervised machine learning is difficult for a user who does not possess knowledge of the field machine learning, and may therefore be incapable of effectively training such a system. For example, a user without knowledge of the field of machine learning may not realise that the distribution of training examples can influence the likelihood that the desired motion characterisation behaviour is captured by the machine learning system. Such a user may therefore fail to prepare training data in a manner that will allow the machine learning process to operate effectively.

Furthermore, a user may attempt to establish a desired motion characterisation behaviour that the system is incapable of reproducing. In doing so the user might inadvertently remove a previously instilled desired motion characterisation behaviour. To identify and address such situations may require knowledge of the field of machine learning. A user who is skilled in the field of machine learning will generally be able to more effectively manage the training process than a user who does not possess knowledge of machine learning.

Accordingly, none of the existing techniques allow for easy configuration of automatic characterisers, such as motion characterisers. In particular such techniques are not generally capable of being configured to reproduce a useful subset of the motion characterisation behaviours desired by their users.

SUMMARY OF THE PRESENT INVENTION

It is an object of the present invention to substantially overcome, or at least ameliorate, one or more disadvantages of existing arrangements.

In a first broad form the present invention provides a method for configuring a machine learning model for use in a motion characterisation process, wherein the method comprises, in a processing system:

a) acquiring user characterisations for respective portions of at least one video sequence;

b) configuring the model using the user characterisations and at least one property associated with the respective portions;

c) determining an inconsistency in the user characterisations using the model;

d) displaying an indication of the inconsistency;

e) determining a selected at least one option for addressing the inconsistency in accordance with user input commands; and, f) reconfiguring the model based on the selected at least one option.

In a second broad form the present invention provides apparatus for configuring a machine learning model for use in a motion characterisation process, wherein the apparatus comprises a processing system for:

a) acquiring user characterisations for respective regions of at least one video sequence;

b) configuring the model using the user characterisations and at least one property associated with the respective portions;

c) determining an inconsistency in the user characterisations using the model;

d) displaying an indication of the inconsistency;

e) determining a selected at least one option for fixing the inconsistency in accordance with user input commands; and, f) reconfiguring the model based on the selected at least one option.

In a third broad form the present invention provides a computer program product for configuring a machine learning model for use in a motion characterisation process, the computer program product being formed from computer executable code which when executed on a suitable processing system causes the processing system to:

a) acquire user characterisations for respective regions of at least one video sequence;

b) configure the model using the user characterisations and at least one property associated with the respective regions;

c) determine an inconsistency in the user characterisations using the model;

d) display an indication of the inconsistency;

e) determine a selected at least one option for fixing the inconsistency in accordance with user input commands; and, f) reconfigure the model based on the selected at least one option.

BRIEF DESCRIPTION OF THE DRAWINGS

An example of the present invention will now be described with reference to the accompanying drawings, in which:—

DETAILED DESCRIPTION INCLUDING BEST MODE

Figure 1:
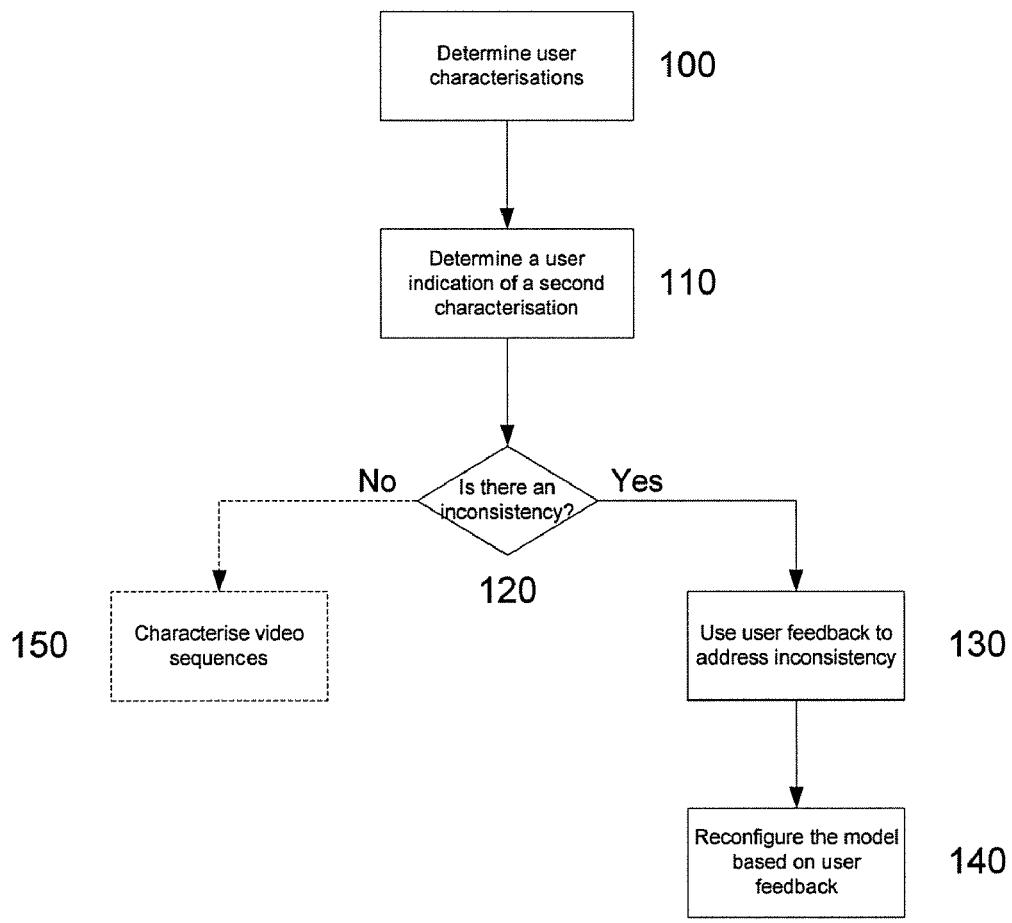
FIG. 1 is a flow chart outlining an example of a process for use in characterising content.

An example of a process for configuring a machine learning model for use in a motion characterisation process, for example for characterising motion within video sequences, will now be described with reference to FIG. 1.

In this example at step 100 user characterisations are determined for respective regions of a video sequence.

The manner in which the user characterisations are determined can vary depending on the preferred implementation, as will be described in more detail below. However, typically this involves a user selecting respective portions of the video sequences, and then providing indications of the characterisation associated with each of the portions. In this regard, the portions may correspond to different segments of the video sequences, in other words different frame sequences, or for could be different spatial regions within the same video segment, or a combination thereof. The portions may therefore comprise spatiotemporal regions in frame sequences in the video sequence. It will be appreciated that this may also be performed on portions of different video sequences, or different portions of the same video sequence depending on the implementation.

In one example first and second characterisations are provided that are different, and may be of any form depending on the preferred implementation. Thus, for example, the purpose of the characterisation process may be to initiate action relating characterised video sequences, such as a selectively recording sequences showing motion that is deemed to be "of interest". In this example, the first and second characterisations could be "of interest" and "not of interest" respectively. However, it will be appreciated that the techniques may be applied to any desired characterisation of video sequences, and that use of the terms "of interest" and "not of interest" is for the purpose of example only.

The user indication may also be provided in a number of manners, such as by having a user manually characterise content, or provide an indication of whether an automated characterisation is correct or incorrect, as will be described in more detail below.

At step 110, the user characterisations are used to configure a model. This may be achieved for example by configuring characterisation criteria, which may be any form of criteria used in characterising the content, and may include for example, a neural network, a decision tree, or the like depending on the implementation. The configuring is typically performed using a machine learning algorithm.

For example, the model and/or characterisation criteria can be updated, with the update being subsequently cancelled in the event that it is inconsistent, or otherwise unsuitable. Thus, if the update results in motion being mischaracterised, the user may select to cancel the update. Alternatively, the configuration could be performed by attempting to update the characterisation criteria and reviewing the proposed update to see if it is suitable prior to actually performing the update.

A further option is to use a duplicate model or set of characterisation criteria, with a first model or set being used in performing characterisation, and a second model or set being used to assess proposed updates. In this case, when attempting an update, the process would involve updating the second set of characterisation criteria, and then determining if the update is suitable. If so, the update can be propagated to the first set of characterisation criteria. If the update is not suitable, the second characterisation criteria can be overwritten with a copy of the first set of characterisation criteria, to thereby effectively cancel the update.

Following this, at step 120, the user characterisations and at least one property of the respective portions of the video sequence, are used to determine if there is an inconsistency.

An inconsistency arises if content that the user has indicated should be characterised in a first way will be characterised in a second way by the updated model and/or characterisation criteria. In other words, an inconsistency arises if the latest update to the model and/or characterisation criteria contradicts a user indication.

At step 130, if an inconsistency has been determined, feedback can be determined from the user to allow the inconsistency to be addressed. This may be achieved in any one of a number of ways, but in one example is achieved by displaying an indication of the inconsistency to the user, allowing the user to select at least one option for addressing the inconsistency, for example to fix the inconsistency.

The aim of this is to allow the user to configure the motion characteriser in a way that the user deems to be acceptable. This may therefore involve removing the inconsistency, or if inconsistency cannot be removed, allowing the user to specify the form of the inconsistency in accordance with the user's preferences for the operation of the motion characteriser.

Thus, for example, if the inconsistency cannot be removed, the user may specify that inconsistency shall be manifest as portions deemed "not of interest" by the user being classified as "of interest". Such an inconsistency may not be a problem, for example, as all regions that the user deems to be "of interest" are correctly identified.

In the event that the user selects an option for addressing the inconsistency, then this is generally used to reconfigure the model, for example by updating the characterisation criteria, at step 140.

Alternatively, if no inconsistency is provided then the characterisation criteria can be used in some manner, such as to characterise video sequences at step 150.

In any event, it will be appreciated that this provides a mechanism to allow user's to update the machine learning model by providing examples of motion characterisations. In one example, by providing examples of contrasting first and second characterisations, this results in an improved learning process.

Furthermore, in one example, by indicating to the user when a proposed modification to the model is inconsistent with any user indications, this avoids user's updating the model in a way that will negate any characterisation indications. This assists user's in assuring that the characterisations are performed correctly.

Figure 2:
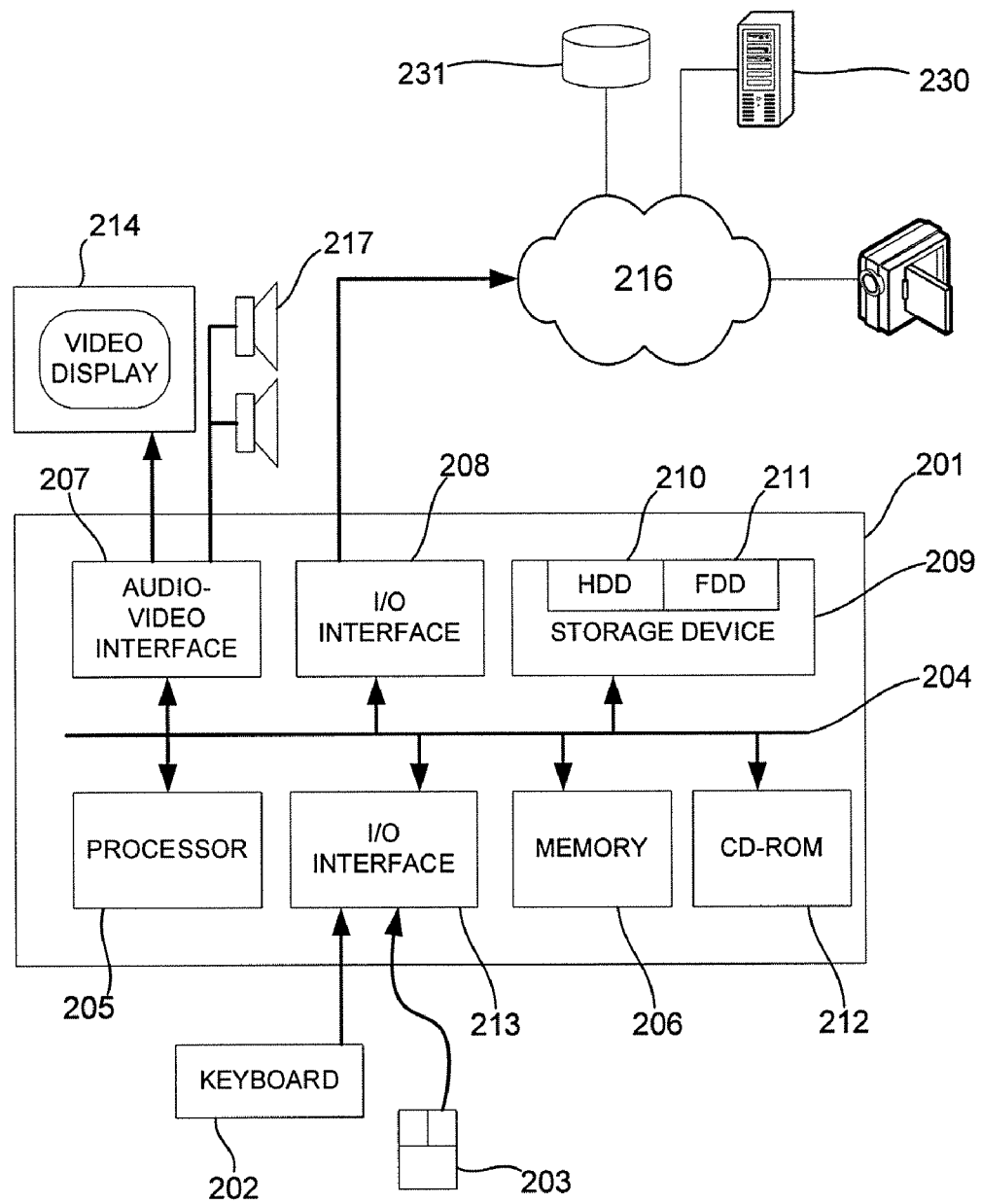
FIG. 2 is a schematic diagram of an example of a computer system.

The process is generally performed using a general-purpose computer system, and an example of a suitable system is shown in FIG. 2.

In this example, the computer system 200 is formed by a computer module 201, input devices such as a keyboard 202 and mouse 203, and output devices including a display device 214 and loudspeakers 217, which are typically connected to appropriate interfaces 207, 208, as shown.

The computer system may also be connected to a communications network 216, such as the Internet, the Web, or other network systems, such as a Local Area Network (LAN) or a Wide Area Network (WAN). This allows the computer system 200 to be connected to one or more devices, such as a remote processing system 230, a database 231, or a video camera 232, to allow content, such as a video to be obtained.

The computer module 201 typically includes at least one processor unit 205, and a memory unit 206, for example formed from semiconductor random access memory (RAM) and read only memory (ROM). The module 201 also includes an number of input/output (I/O) interfaces including an audio-video interface 207 that couples to the video display 214 and loudspeakers 217, an I/O interface 213 for the keyboard 202 and mouse 203 and optionally a joystick (not illustrated), and an I/O interface 208 for connection to the communications networks.

A storage device 209 is provided and typically includes a hard disk drive 210 and a floppy disk drive 211. A magnetic tape drive (not illustrated) may also be used. A CD-ROM drive 212 is typically provided as a non-volatile source of data.

The components 205 to 213 of the computer module 201, typically communicate via an interconnected bus 204 and in a manner that results in a conventional mode of operation of the computer system 200 known to those in the relevant art. Examples of computers on which the described arrangements can be practised include IBM-PC's and compatibles, Sun Sparcstations or the like.

The process of configuring a content characteriser, and optionally characterising content, is typically implemented using software, such as one or more application programs executing within the computer system 200. Typically, the application activates a graphical user interface (GUI) on the video display 214 of the computer system 200 which displays content to the user, allowing the user to view characterisation results, and provide feedback as to it's accuracy.

The methods and processes are affected by instructions in the software application that are carried out by the computer. The instructions may be formed as one or more code modules, each for performing one or more particular tasks.

The software may be stored in a computer readable medium, and loaded into the computer, from the computer readable medium, to allow execution. A computer readable medium having such software or computer program recorded on it is a computer program product. The use of the computer program product in the computer preferably affects an advantageous apparatus for viewing documents to be printed.

Typically, the application program, by which a user of the computer 200 can configure the content characteriser is resident on the hard disk drive 210 and read and controlled in its execution by the processor 205. Intermediate storage of the program and any content for characterisation may be accomplished using the semiconductor memory 206, possibly in concert with the hard disk drive 210. In some instances, the application may be supplied to the user encoded on a CD-ROM or floppy disk and read via the corresponding drive 212 or 211, or alternatively may be read by the user from the network 220 via the modem device 216. Still further, the software can also be loaded into the computer system 200 from other computer readable media.

The term "computer readable medium" as used herein refers to any storage or transmission medium that participates in providing instructions and/or data to the computer system 200 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 201. Examples of transmission media include radio or infra-red transmission channels as well as a network connection to another computer or networked device, and the Internet or Intranets including e-mail transmissions and information recorded on Websites and the like.

Figure 3A:
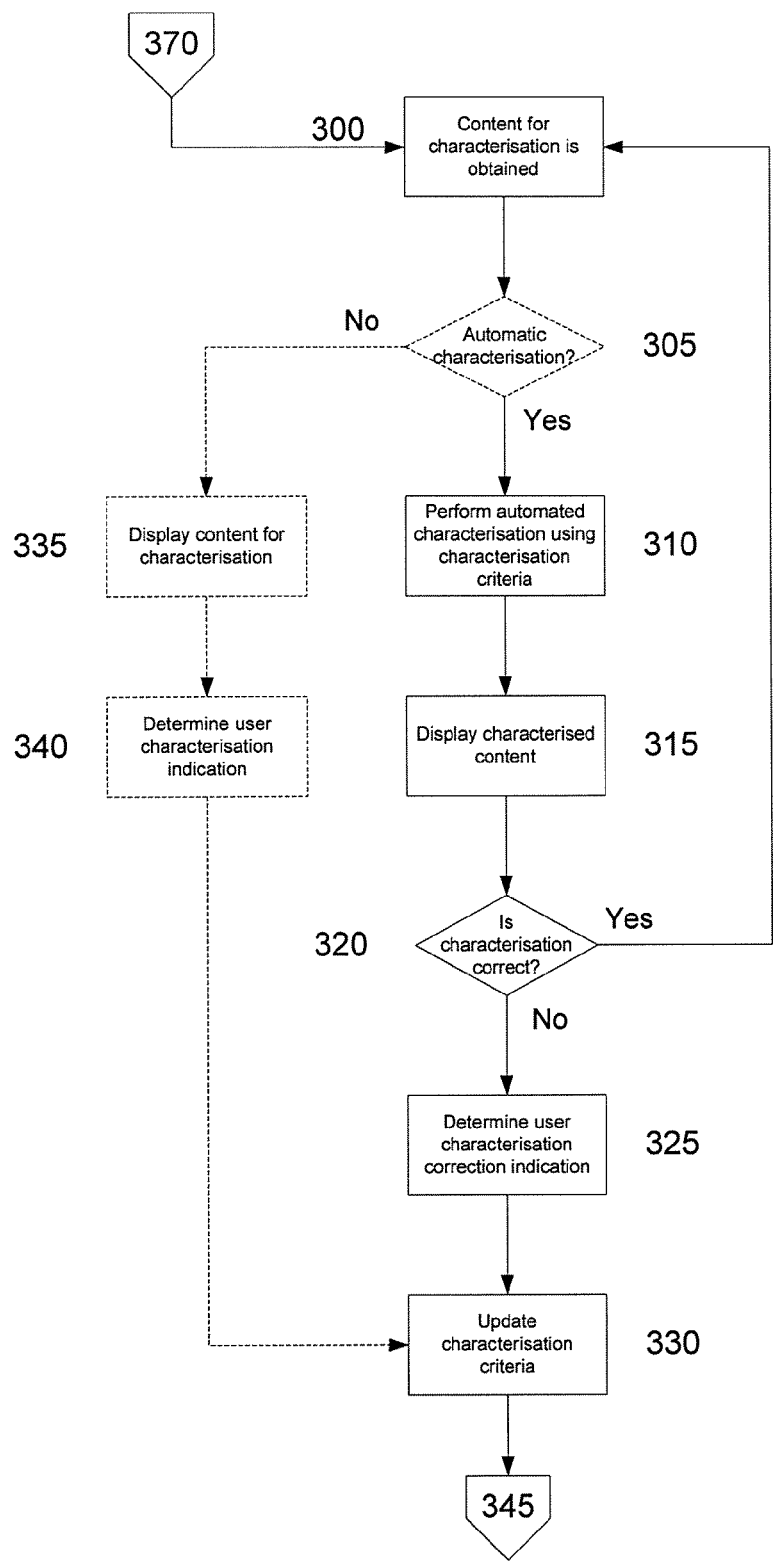
FIG. 3 is a flow chart of an example of a process for characterising content.
Figure 3B:
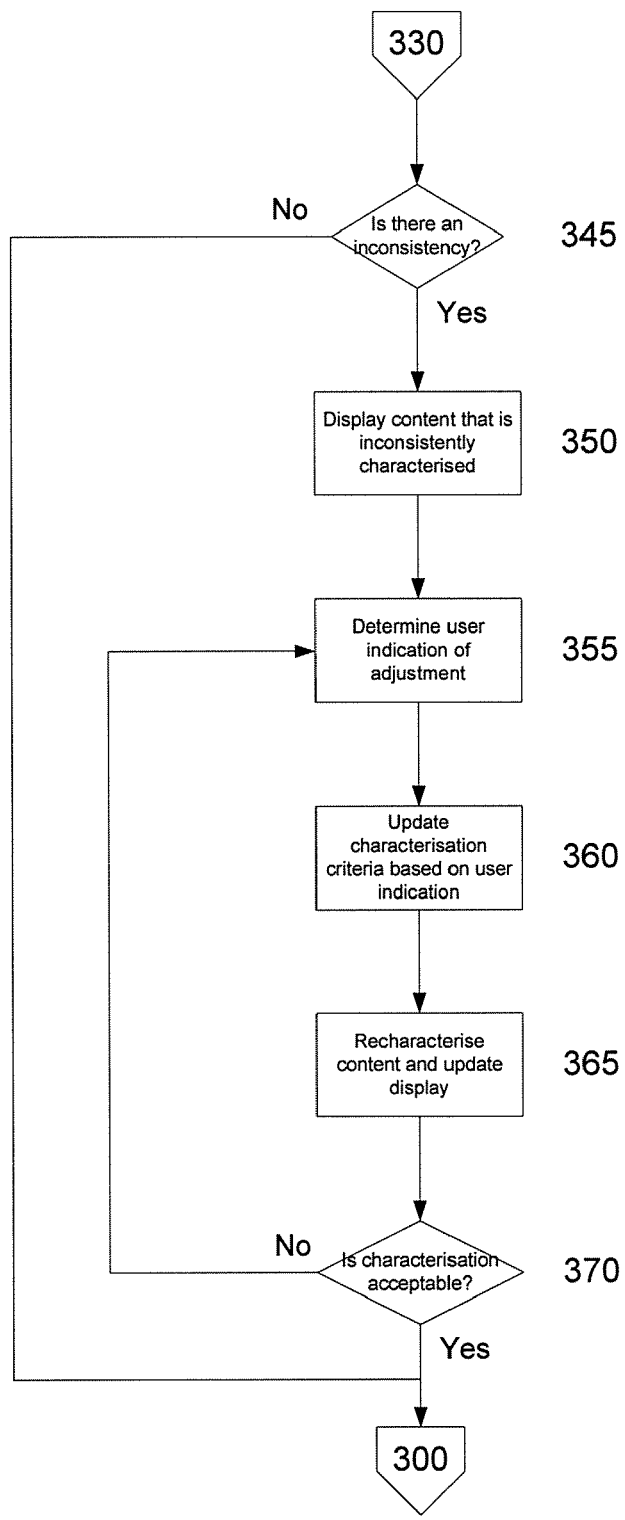

An example of the process of characterising content and configuring the characteriser using the computer system 200 will now be described in more detail with respect to FIG. 3.

At step 300, the computer system 200 obtains content for characterisation. This may be achieved for example by monitoring a video source, such as a camera 232, or by downloading video content from a predetermined location.

At step 305, the process may optionally allow an assessment to be made of whether the characterisation should be automatic at step 305. This may depend on factors such as whether sufficient configuration of the characteriser has been performed, and user instructions. Thus, this allows the user to manually configure the motion characteriser by selecting different characterisation examples from video sequences.

Typically however, automatic characterisation of video sequences is used, with the user operating to provide corrections for any incorrect characterisations, as will now be described. In this example, at step 310 the computer system 200 operates to perform automated characterisation using predetermined characterisation criteria, as will be described in more detail below.

At step 315 the characterised content can be displayed to the user, using a suitable GUI, allowing the user to make the assessment of whether the characterisation is correct at step 320. If the characterisation is correct then no further action is required and the process can return to step 300 to allow further content to be assessed.

However, if the characterisation is incorrect, then the user will provide a correction indication at step 325. This is typically achieved utilising one or more suitable GUIs, as will be described in more detail below with respect to FIGS. 13 and 14. In this regard, the GUIs allow a user to select the incorrect characterisation, and to provide a correct characterisation.

For example, the computer system 200 may display a portion of the video content, such as a sequence of frames, and highlight different spatial regions that have been characterised. The regions are typically indicated using a polygon, such as a rectangle, or the like, which indicates the spatial extent of the region.

In this example, the user can designate a region of the video sequence using an input device, such as the mouse, and then indicate that the characterisation within this region is incorrect. Typically this is achieved by displaying a polygon representing a spatial region, which the user can then reposition and/or resize using the mouse, to thereby define the extent of the user designated region. It will also be appreciated that the user designated region may be different to the spatial regions characterised by the computer system, and may for example, encompass one or more of these regions.

The indication of an incorrect characterisation is typically achieved by displaying an adjustment indicator, such as input buttons, allowing the user to indicate an adjustment factor. Thus, for example, the user can indicate if the motion characterisation is "too sensitive" or "not sensitive enough", indicating that at least some of the video within the user designated region is incorrectly characterised.

If content is not automatically characterised, then at step 335 the computer system 200 will operate to display content for characterisation to the user with the user then operating to provide a characterisation indication at step 340.

In either case, once a user indication of a characterisation has been received, this is used to update the model and in particular the characterisation criteria at step 330.

At step 345 the computer system determines if there is an inconsistency following the update of the characterisation criteria. An inconsistency occurs when the updated characterisation criteria result in a characterisation that contradicts any characterisation specified by the user. Thus, for example, if a user indicates that content should be characterised as "of interest" and the updated characterisation results in the content as being classified as "not of interest", this indicates an inconsistency is present.

In general, such inconsistencies will mean that motion that was previously characterised by the system so as to agree with a user characterisation will no longer be correctly characterised by the system after the update. Alternatively, the system may not be able to correctly characterise the current motion based on the user's supplied characterisation indication.

In this example, if an inconsistency is determined, then at step 350 the computer system 200 displays an indication of the inconsistency. This can be performed in any one of a number of ways, but typically involves selecting examples of video sequences where the motion is no longer characterised in accordance with the user defined characterisation. These examples can then be displayed to the user on a GUI, such as the GUI shown in FIG. 20 and described in more detail below.

This will typically include examples of false positives, where motion that the user indicates is "not of interest" is incorrectly classified as being "of interest" and false negatives, where motion indicated by the user to be "of interest" is incorrectly classified as being "not of interest".

In addition to this, the computer system may also provide an indication of the relative number of false positives and false negatives compared to the number of correct characterisations.

By presenting examples of inconsistencies, this allows the user to address the inconsistency by adjusting the characterisation criteria at step 355. In one example, this is achieved by having the computer system display an indication of one or more options for addressing the inconsistency, allowing the user to select one of the options. This can be achieved for example, by allowing the user to adjust the sensitivity of the motion detection. This allows the computer system to update the model, re-characterise the content and update the display at step 365 with this allowing the user to assess whether the new characterisation is acceptable at step 370.

In this sense, acceptable means adequate for the user's purpose, and will typically not involve having a 100% accuracy for the characterisation. Thus, for example, if the motion characteriser is to be used to control whether video sequences from a security camera are recorded, it may be more important to ensure all situations in which there is motion "of interest", are recorded. In this instance, the user would therefore prefer to minimise the number of false negatives, to thereby ensure that video "of interest" is not characterised as being "not of interest". This could be at the expense of having a higher number of false positives, although, in this instance, such inconsistencies would be of less concern to the user, as it would still ensure all required video sequences are recorded.

If the characterisation is not acceptable, the process can return to step 355 to allow further adjustment by the user. Otherwise the process can return to step 300 to allow the user to perform further training. Alternatively, if the user is happy with the current characterisation, the process can be used to simply perform automated characterisation using the updated model and associated characterisation criteria.

In any event, it will be appreciated that this provides a mechanism that allows a user to train a motion characteriser based on examples, and in particular based on examples of both first and second characterisations. This can includes for example, providing example of video content "of interest" and video content that is "not of interest".

However, it will be appreciated that the techniques are not limited to the use of two characterisations, and this is for the purpose of example only. Thus, a range of different characterisations could be used, such as "car", "person" and "not of interest".

In addition to this, the system can also display inconsistencies to the user, allowing the user to determine the impact of the provided examples, and consequently adjust the characterisation as desired.

A specific example of configuring a motion characteriser will now be described.

For the purpose of this example, it is assumed that known foreground separation techniques are applied to a video stream, allowing the computer system 200 to detect regions of foreground that are associated with a single object, which may span multiple image frames. Such regions of foreground that are associated with a single object are referred to as being a "motion thread". In this example, the values of a number of attributes of detected motion threads are calculated, allowing the computer system 200 to characterise detected motion threads based on the values of the attributes of the motion threads.

For each frame in the video stream, for each detected motion thread that is present in the frame, the system outputs the spatial location of the motion thread within the frame, and the system's characterisation of the motion thread. For the purpose of this example, the characterisation of a motion thread is referred to as the "label" of the motion thread.

This output can then be used by a client application to perform operations such as to initiate recording of a video stream being sent from a camera, to change the pan, tilt and zoom settings of a pan, tilt and zoom camera in order to track an object, to send a message to the pager of a security guard, and to create an index of significant motion events.

Figure 4:
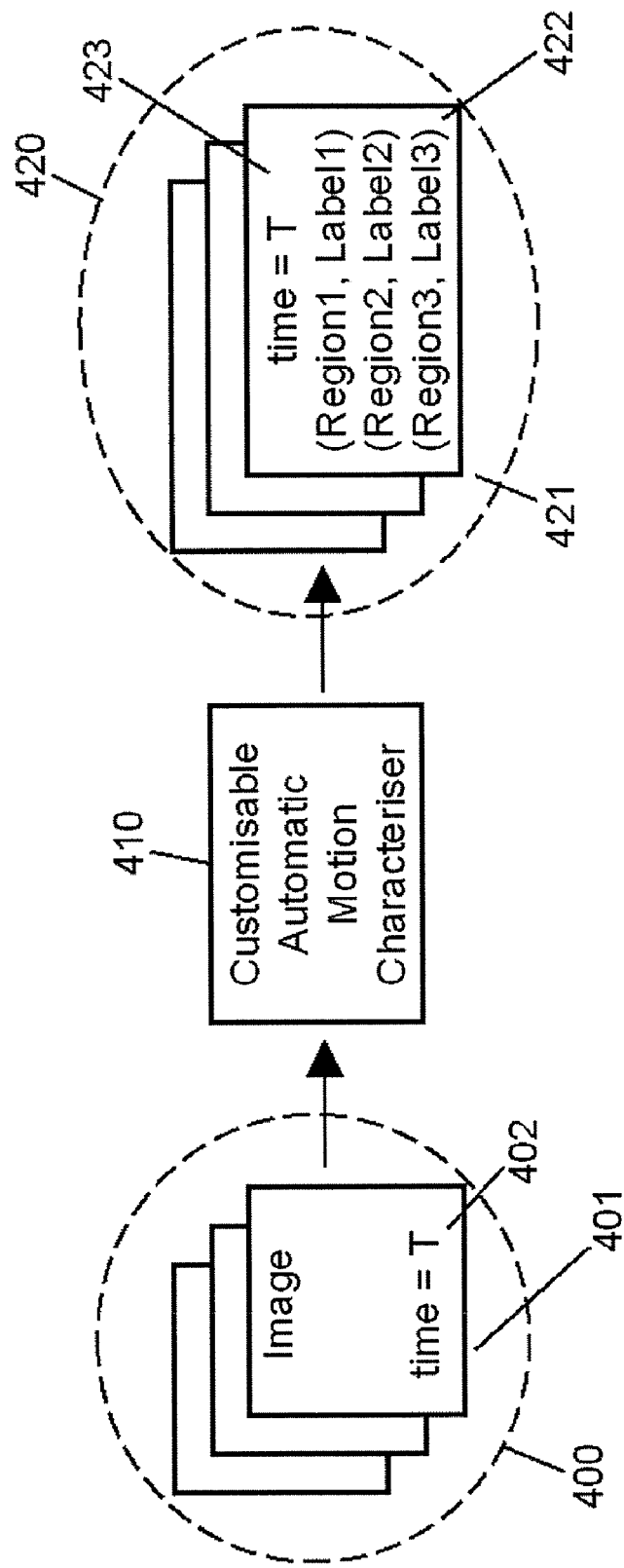
FIG. 4 is a schematic representation of one example of inputs and outputs of a customisable automatic motion characteriser.

A customisable automatic motion characteriser 410 is shown in with reference to FIG. 4. The customisable automatic motion characteriser 410 receives an image sequence 400 as input, and outputs a characterised motion list sequence 420. Each image 401 in the image sequence 400 consists of image data and a timestamp 402. For each image 401 in the image sequence 400, a corresponding characterised motion list 421 is output. The characterised motion list 421 contains a timestamp 423, whose value is equal to the value of the timestamp 402 of the corresponding image 401. The characterised motion list 421 also contains zero or more location label pair 422 elements. In one example, the location label pair 422 consists of a region description that describes a rectangular region within the image 401, and a label for the region description.

Figure 5:
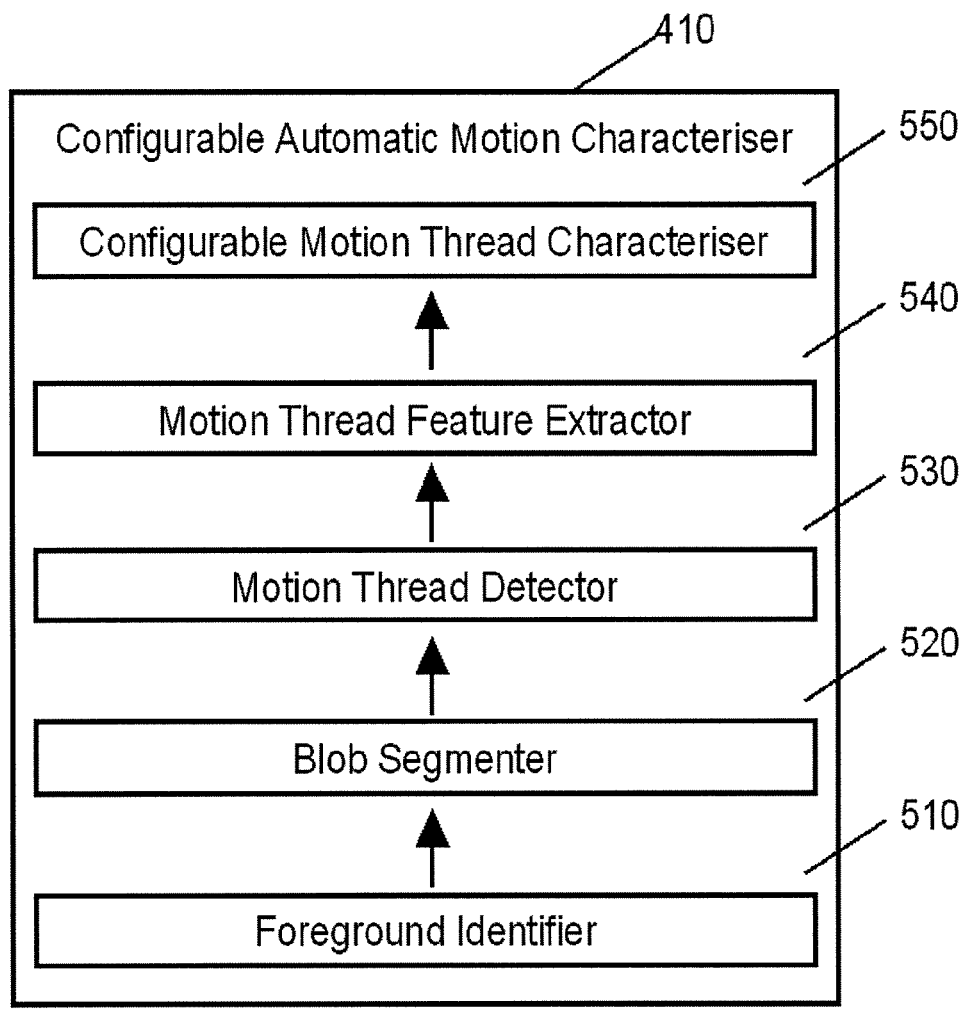
FIG. 5 is a schematic representation of one example of functional components of the automatic motion characteriser.

FIG. 5 shows the functional components of the customisable automatic motion characteriser 410, namely a foreground identifier 510, a blob segmenter 520, a motion thread detector 530, a motion thread feature extractor 540, and a configurable motion thread characteriser 550.

Figure 6:
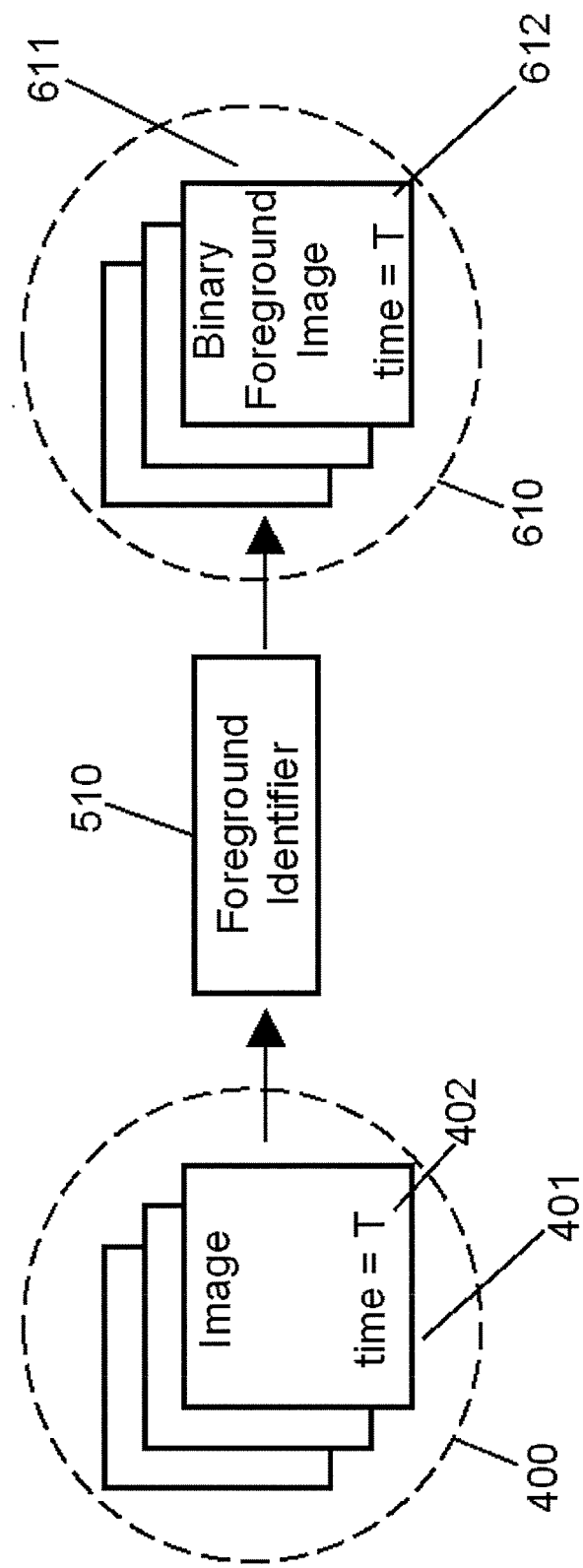
FIG. 6 is a schematic representation of one example of inputs and outputs of a foreground identifier of the customisable automatic motion characteriser.

FIG. 6 shows the inputs and outputs of the foreground identifier 510. The foreground identifier 510 takes an image sequence 400 as input, and outputs a binary foreground image sequence 610. For each image 401 in the image sequence 400, a corresponding binary foreground image 611 is output. The binary foreground image 611 includes a timestamp 612 that is equal to the timestamp 402 of the image 401. Within the binary foreground image 611, a pixel of value one indicates foreground, and a zero pixel indicates background.

In one example, images in the image sequence 400 are based on an 8-bit RGB colour model and occur at a frequency of fifteen frames per second. In this example, the foreground identifier 510 operates by subtracting a frame in the image sequence 400 from the frame that occurs five positions earlier in the image sequence 400, to thereby generate a colour difference image. Each colour channel of a pixel in the colour difference image is given the absolute value of the difference of the corresponding colour channel of the corresponding pixels in the minuend image and subtrahend image. A pixel in the binary foreground image 611 is given a value of one if the square root of the sum of the squares of the colour components of the corresponding pixel in the colour difference image is greater than a threshold which is preferably five, and is given a value of zero otherwise.

The process can employ a foreground identifier 510 that is based on an alternative approach, such as an approach based on adaptive background modelling or optical flow.

Figure 7:
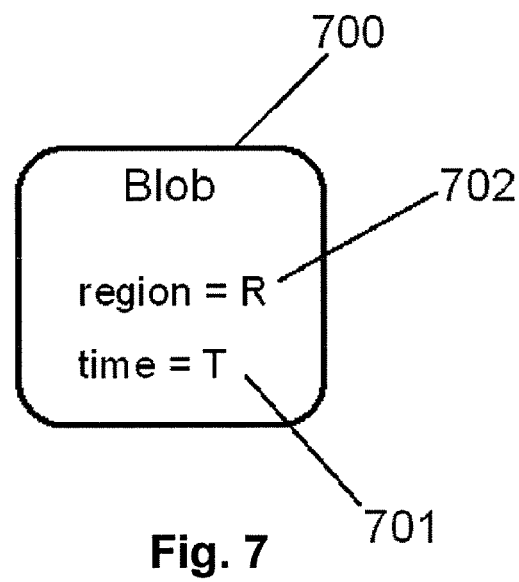
FIG. 7 is a schematic representation of one example of components of a blob.

A blob 700 is shown in FIG. 7. The blob 700 corresponds to a connected region of non-zero pixels in the binary foreground image 411. The blob 700 has a region 702 and a timestamp 701. The region 702 represents the region in two-dimensional image space occupied by the connected region of non-zero pixels in the binary foreground image 611 with which the blob 700 corresponds. The value of the timestamp 701 of the blob 700 is equal to the value of the timestamp 612 of the binary foreground image 611.

In one example, the region 702 of the blob 700 has a width property, a height property, an x-coordinate property, and a y-coordinate property. The values of the width property, height property, x-coordinate property and y-coordinate property are set so as to describe an axes parallel rectangle of minimum area that encloses the connected region of non-zero pixels in the binary foreground image 611 with which the blob 700 corresponds.

Figure 8:
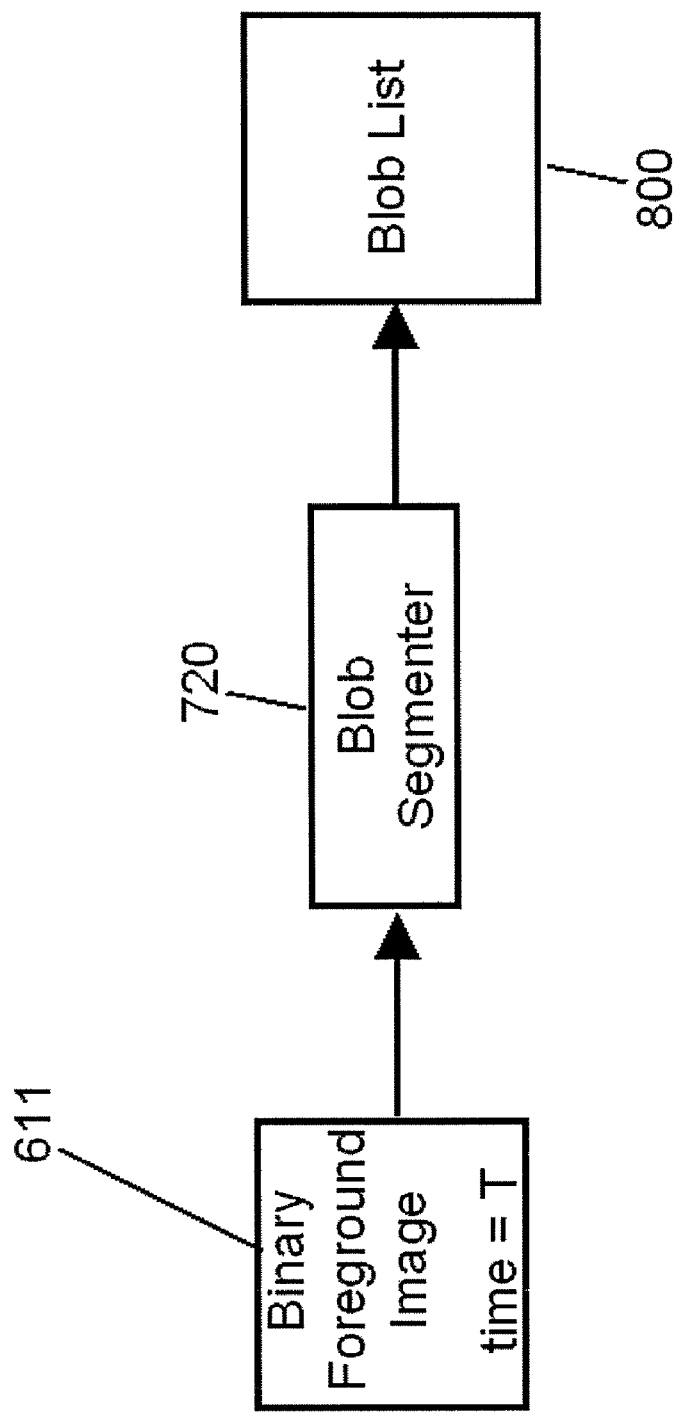
FIG. 8 is a schematic representation of one example of inputs and outputs of a blob segmenter of the customisable automatic motion characteriser.

The blob segmenter 520 will now be described in more detail with respect to FIG. 8. In this example, the blob segmenter 520 takes a binary foreground image 611 as input, and outputs a blob list 800. For each discrete, connected region of non-zero pixels present in the binary foreground image 611, the blob list 800 will contain a corresponding blob. In one example, the blob segmenter 520 is based on a flood fill algorithm that employs the 4-neighbour model of connectivity, although other techniques can be used.

Figure 9:
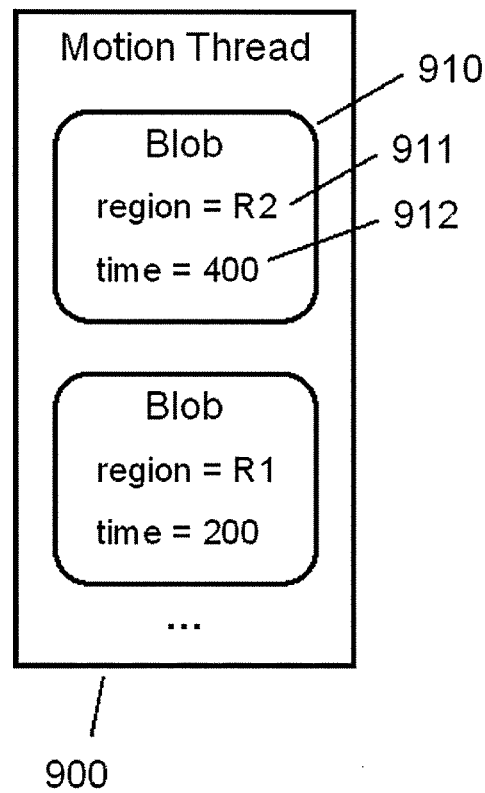
FIG. 9 is a schematic representation of one example of the components of a motion thread.

FIG. 9 is an example of a motion thread 900. The motion thread 900 is a collection of blobs 700. The blob with the maximum timestamp value among the blobs of a motion thread is known as the "most recent" blob of the motion thread. A blob 700 is said to "overlap" the motion thread 900 if the region 702 of the blob 700 intersects in image space with the region 911 of the most recent blob 910 of the motion thread 900, and the timestamp 701 of the blob 700 is greater than the timestamp 912 of the most recent blob 910 of the motion thread 900.

Figure 10:
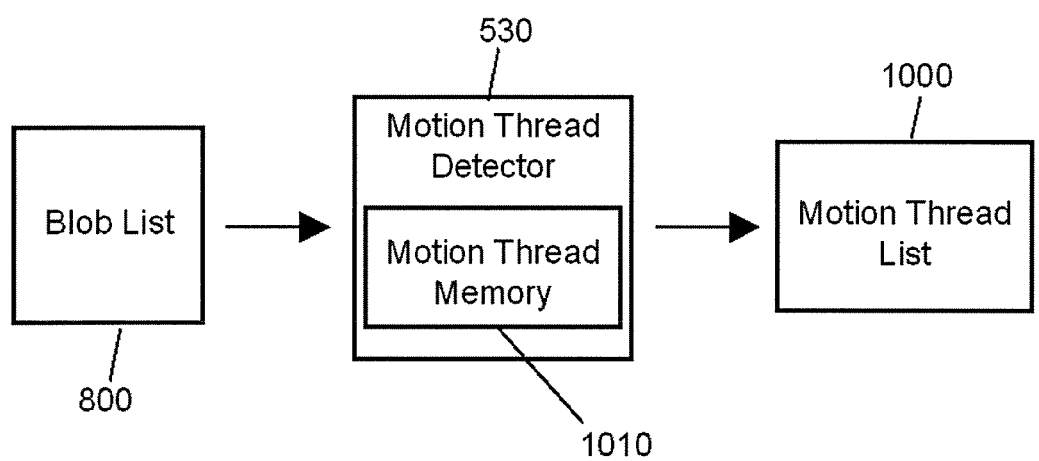
FIG. 10 is a schematic representation of one example of inputs and outputs of a motion thread detector of the customisable automatic motion characteriser.

An example of the motion thread detector 530 will now be described with reference to FIG. 10. The motion thread detector 530 takes as input the blob list 800, which was generated by the blob segmenter 520, and outputs a corresponding motion thread list 1000, which is a collection of motion threads, and is initially empty.

The motion thread detector 530 contains a motion thread memory 1010, which stores a collection of previously detected motion threads. For each current blob in the blob list 800, the motion thread detector 530 iterates over each current motion thread in the motion thread memory 1010 until a current motion thread is found that is overlapped by the current blob, or until all motion thread in the motion thread memory 1010 have been tested.

If the current blob in the blob list 800 overlaps the current motion thread in the motion thread memory 1010, the current blob is added to the current motion thread, and the current motion thread is added to the motion thread list 1000.

If the current blob in the blob list 800 does not overlap any motion thread in the motion thread memory 1010, the current blob is added to a new motion thread, and the new motion thread is added to both the motion thread memory 1010 and the motion thread list 1000.

Once each blob in the blob list 800 has been tested for overlapping against motion threads in the motion thread memory 1010, the motion thread detector 530 may remove motion threads from the motion thread memory 1010. To achieve this, for each motion thread in the motion thread memory 1010, the difference between the timestamp of the blob list 800 and the timestamp of the most recent blob of the motion thread is calculated. If the difference is greater than a threshold that is preferably one second, the motion thread is removed from the motion thread list 1000.

In this example, the function of the motion thread detector 530 is to group regions of foreground that are associated with a single object, and that occur over multiple frames. A motion thread detector 530 that is based on a different approach, such as an approach based on an analysis of the trajectory of moving objects, can alternatively be used.

Figure 11:
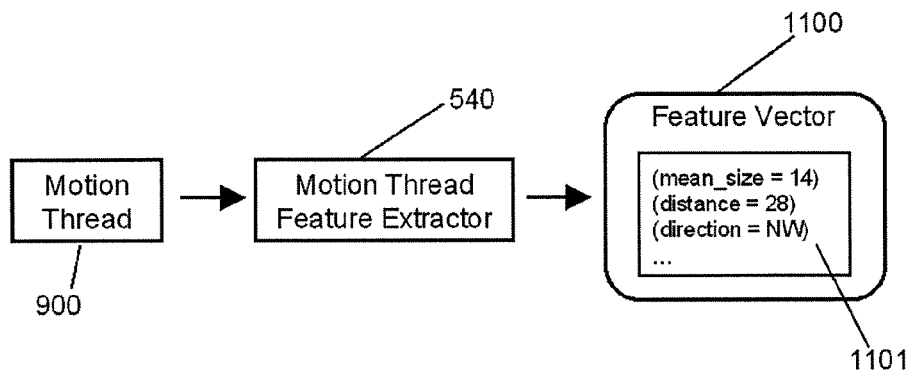
FIG. 11 is a schematic representation of one example of inputs and outputs a motion thread feature extractor of the customisable automatic motion characteriser.

An example of motion thread feature extractor 540, will now be described in more detail with respect to FIG. 11. In this example, the motion thread feature extractor 540 takes a motion thread 900 as input, and outputs a feature vector 1100. The feature vector 1100 is a collection of attribute value pair 1101 elements, where the attribute value pair 1101 consists of an attribute and a value for the attribute. The process applies the motion thread feature extractor 540 to each motion thread within the motion thread list 1000.

In one example, the motion thread feature extractor 540 calculates the value of features representing:

the number of unique timestamps among the blobs of the motion thread 900;

the time difference between the oldest and newest blobs of the motion thread 900;

the average area of the blobs of the motion thread 900;

the variation in the area of the blobs of the motion thread 900;

the distance between the centroids of the oldest and newest blobs of the motion thread 900;

the direction from the centroid from the oldest blob to the centroid of the newest blob of the motion thread 900;

the area of the newest blob of the motion thread 900; and the region of the newest blob of the motion thread 900, such as a width feature, a height feature, an x-coordinate feature, and a y-coordinate feature.

However, alternatively, other features can be employed by the motion thread feature extractor 540, such as features relating to the shape of the blobs of the motion thread 900, or features relating to the intensities of pixels in the image sequence 5400 that correspond to the blobs of the motion thread 900.

Figure 12:
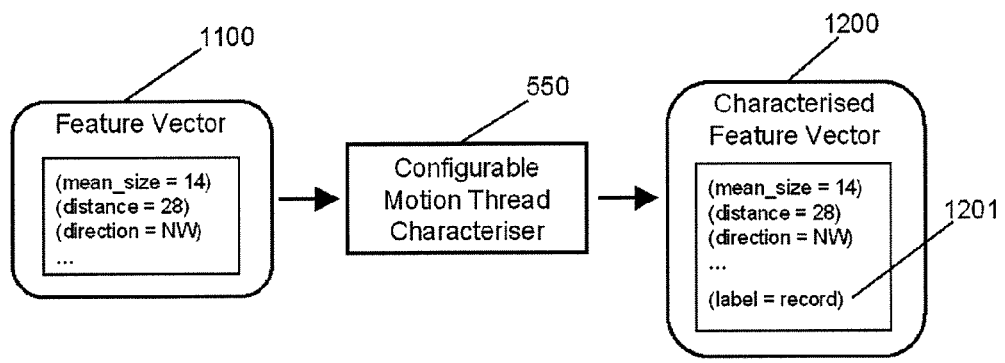
FIG. 12 is a schematic representation of one example of inputs and outputs of a motion thread feature characteriser of the customisable automatic motion characteriser.

FIG. 12 is an example of the configurable motion thread characteriser 550, which takes a feature vector 1100 as input, and outputs a characterised feature vector 1200. The characterised feature vector 1200 contains the attribute value pair 1101 elements of the feature vector 1100 and additionally a category feature 1201. In one example, the category feature 1201 may take either the value "record" or the value "do not record".

In one example the configurable motion thread characteriser 550 includes a display device and a user-controlled pointer, such as a computer screen and a mouse, or a touch sensitive screen, and it will be appreciated that this can be implemented using the computer system 200.

Figure 13:
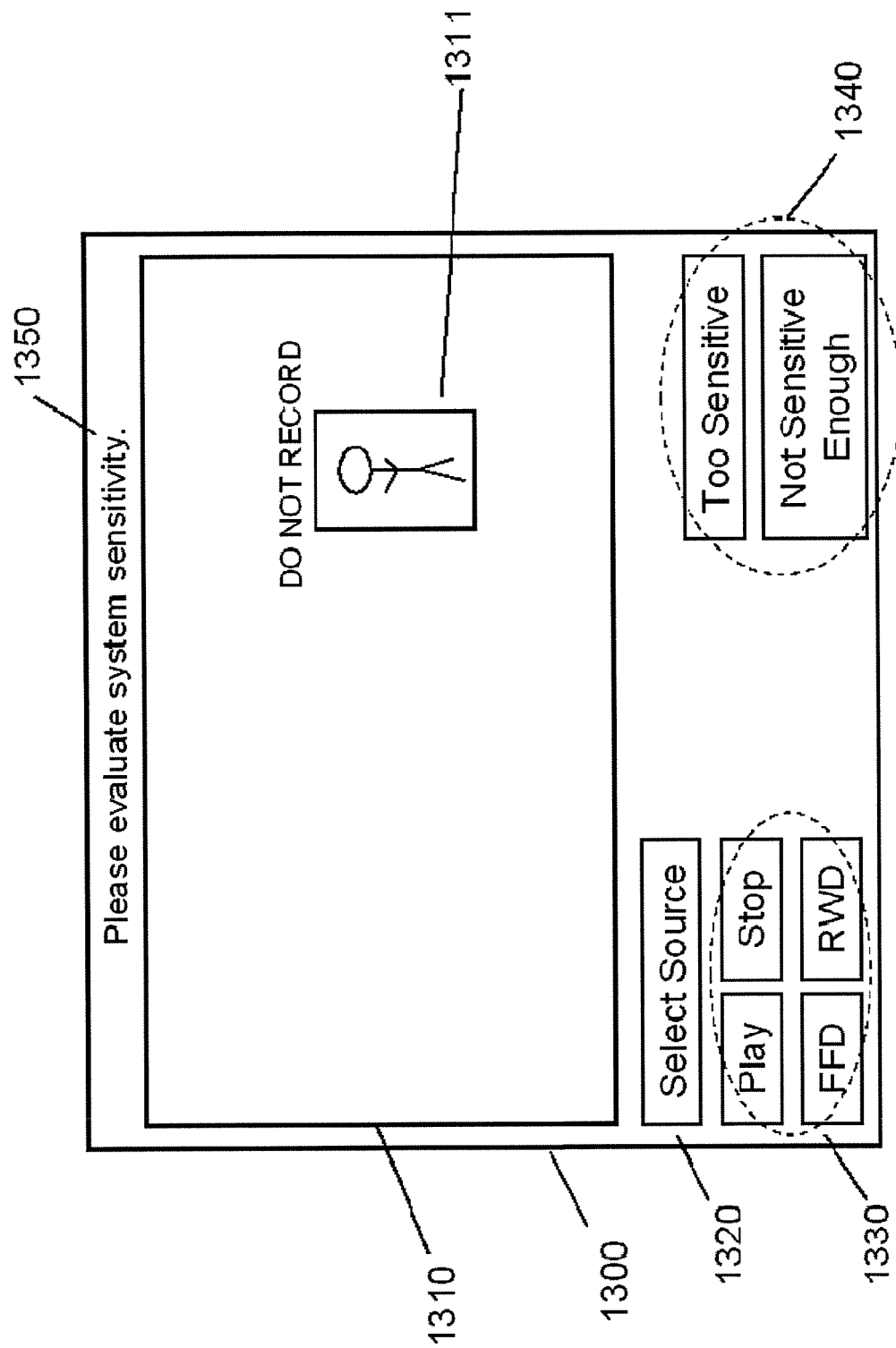
FIG. 13 is a schematic representation of a first example of a graphical user interface of the customisable automatic motion characteriser.

In this case, the computer system 200 typically displays a first GUI 1300, as shown in FIG. 13. The GUI includes of a video display area 1310, a video source control interface 1320, a video playback control interface 1330, a sensitivity feedback interface 1340, and a system message 1350.

The video source control interface 1320 allows a user to select an image sequence 400, such as a video file, a live feed from a video camera, or the like. The video playback control interface 1330 allows a user to control the playback of the image sequence 400, which is displayed within the video display area 1310. The system message 1350 provides the user with instructions.

In this example, the extent of the displayed labelled region 1311 is represented by a polygon, in this case a rectangle, drawn within the video display area 1310 for each characterised feature vector 1200 output by the configurable motion thread characteriser 550.

Thus, for example, the displayed labelled region 1311 can be the region specified within the characterised feature vector 1200. This displayed labelled region 1011 can be in the form of a red rectangle if the value of the category feature 1201 of the characterised feature vector 1200 is "record", and is a grey rectangle if the value is "do not record". Alternatively, or additionally, the value of the category feature 1201 of the characterised feature vector 1200 can be displayed adjacent to the displayed labelled region 1311.

In any event, it will be appreciated that this corresponds to displaying the characterised content as described at step 315 above.

In this example, the configurable motion thread characteriser 550 is deemed "too sensitive" if it displays a "record" displayed labelled region 1311 over an object that the user does not wish to record. The configurable motion thread characteriser 550 is deemed "not sensitive enough" if it displays a "do not record" displayed labelled region 1311 over an object that the user does wish to record.

Figure 14:
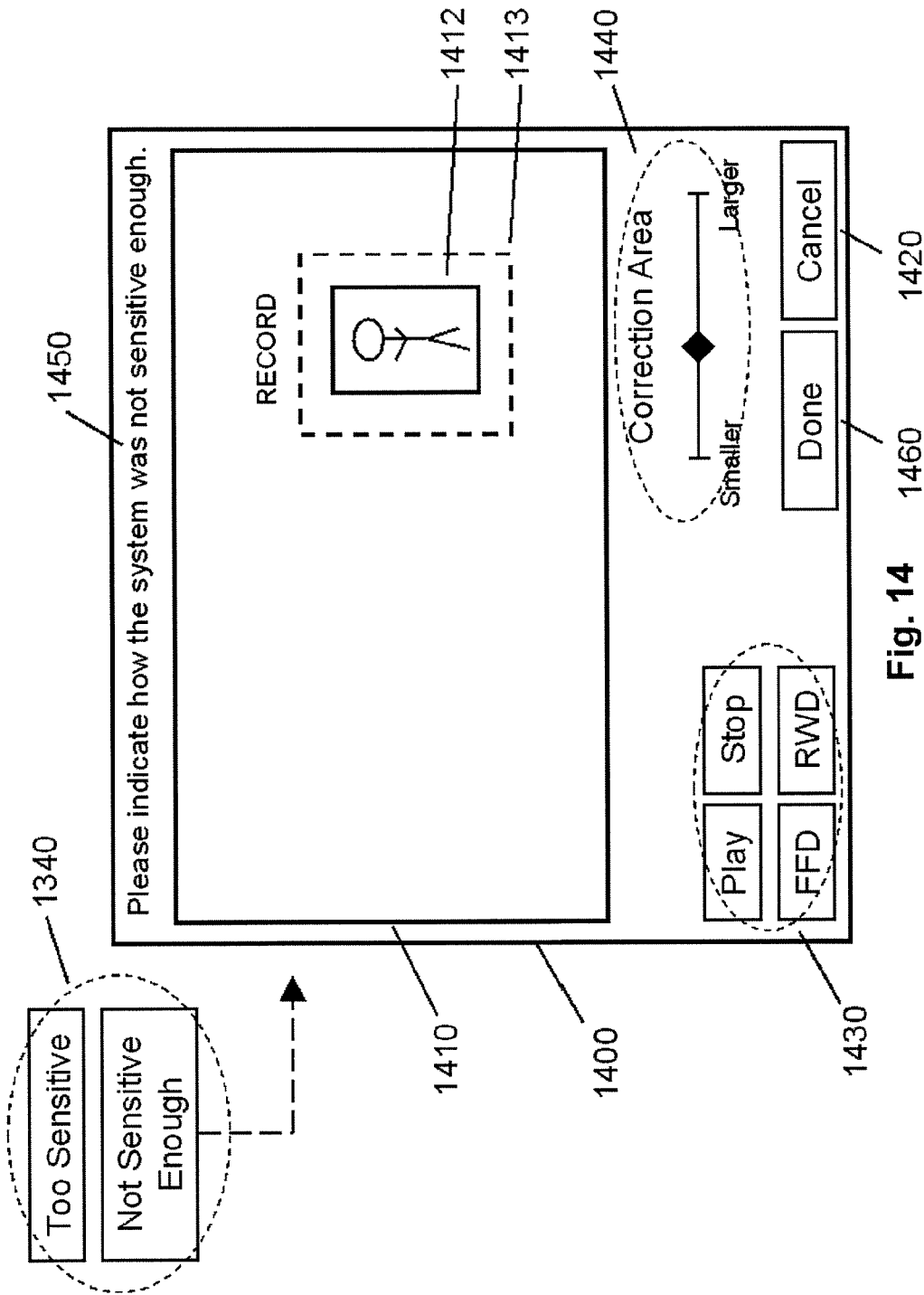
FIG. 14 is a schematic representation of a second example of a graphical user interface of the customisable automatic motion characteriser.

If the configurable motion thread characteriser 550 is too sensitive, or is not sensitive enough, the user may indicate as such by means of the sensitivity feedback interface 1340, thereby providing a correction indication at step 325. To achieve this, a second user interface 1400, is presented as shown in FIG. 14.

In this example, the second user interface 1400 consists of a video display area 1410, a cancel operation button 1420, a video playback control interface 1430, a correction area size control interface 1440, a system message 1450, and an operation complete button 1460.

The system message 1450 provides the user with instructions. If selected, the cancel operation button 1420 will result in the first user interface 1300 being displayed. The video playback control interface 1430 allows a user to control the playback of the image sequence 400, which is the image sequence 400 that was selected by the user by means of the video source control interface 1320 of the first user interface 1300. The image sequence 400 is displayed within the video display area 1410.

The correction area size control interface 1440 allows the user to specify the size or extent of a correction area 1413, which is an area of interest. In one example, the correction area 1413 is displayed in the form of a polygon, such as a rectangle, which is red if the system was deemed is not sensitive enough, and grey if the system was deemed too sensitive. Alternatively, or additionally, "record" or "do not record" labels can be displayed as required. The user may also specify the location of the correction area 1413 by means of a pointing device such as a computer mouse or touch sensitive screen.

Should a displayed labelled region 1412 intersect with the correction area 1413, the characterised feature vector 1200 with which the displayed labelled region 1412 corresponds is added to a user characterised feature vector list 1510, discussed in more detail below.

In one example, the characterised feature vector 1200 is only added to the user characterised feature vector list 1510 if the corresponding displayed labelled region 1412 is entirely contained within the correction area 1413. As a result of pressing the operation complete button 1460, the user characterised feature vector list 1510 is passed as input to the configurable motion thread characteriser 550.

In another example, the user characterised feature vector list 1510 is automatically passed as input to the configurable motion thread characteriser 550 if the user characterised feature vector list 1210 reaches a certain size.

Figure 15:
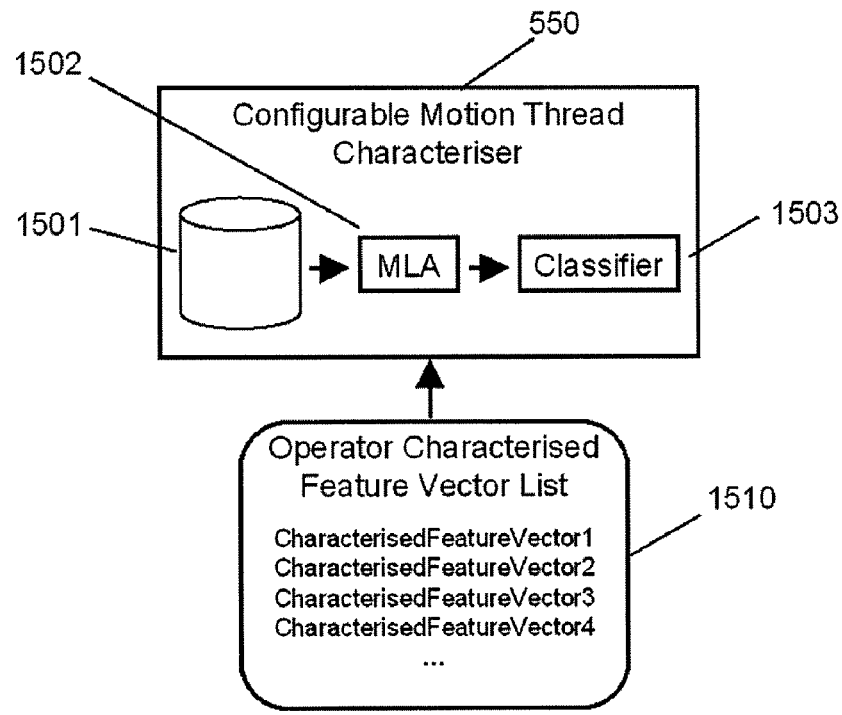
FIG. 15 is a schematic representation of a first example of a configurable motion thread characteriser.

An example of the configurable motion thread characteriser 550 will now be described with respect to FIGS. 15 and 16.

In this example, upon receipt of the user characterised feature vector list 1510, the configurable motion thread characteriser 550 adds the content of the user characterised feature vector list 1510 to a persistent user correction list 1501. The persistent user correction list 1501 is passed as input to a machine learning algorithm 1502, which generates a classifier 1503 as output.

In one example, the machine learning algorithm 1502 is a c4.5 algorithm, but could alternatively be another machine learning algorithm such as a feed forward neural network algorithm.

Figure 16:
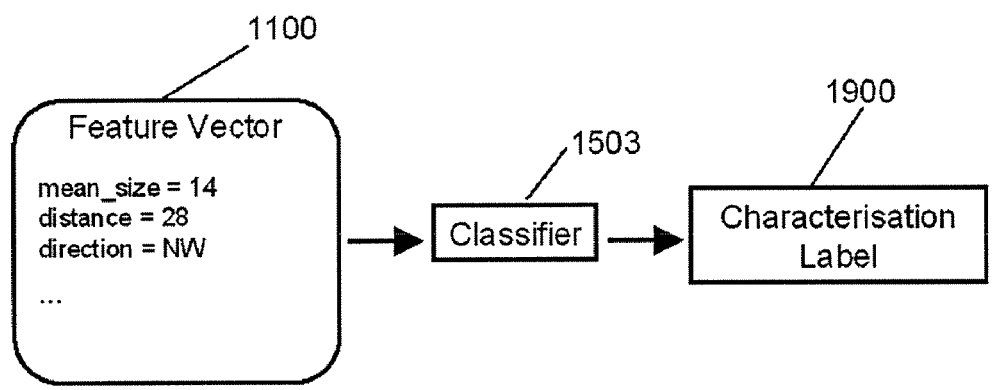
FIG. 16 is a schematic representation of an example of inputs and outputs of a classifier.

As show in FIG. 16, the classifier 1503 takes a feature vector 1100 as input and produces a characterisation label 1600 as output. The classifier 1503 is used by the configurable motion thread characteriser 550 to set the value of the category feature 1201 of a characterised feature vector 1200 that is generated as output in response to receiving a feature vector 1100 as input.

Figure 17:
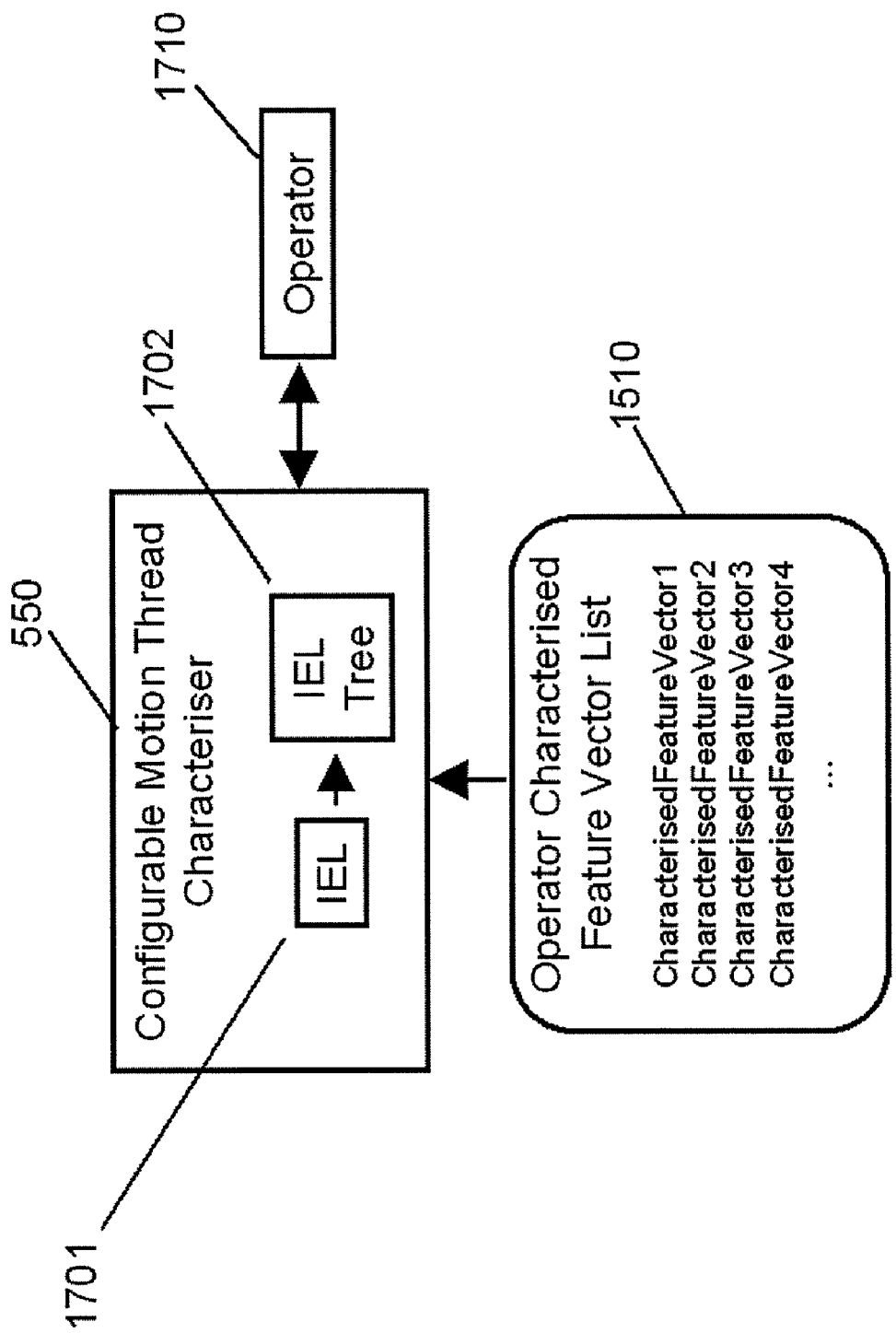
FIG. 17 is a schematic representation of a second example of a configurable motion thread characteriser.

An alternative example of the configurable motion thread characteriser 550 will now be described with respect to FIGS. 17 to 19.

In this example, configurable motion thread characteriser 550 utilises the incremental exception learner (IEL) algorithm as the mechanism for establishing a configuration. In this case, given a user characterised feature vector list 1510 as input, the IEL algorithm 1701 updates the state of an IEL tree 1702 in a manner that is described below.

The IEL tree 1702 is a classifier that takes a feature vector 1100 as input and produces a characterisation label 1600 as output. The IEL tree 1702 is used by the configurable motion thread characteriser 550 to set the value of the category feature 1201 of a characterised feature vector 1200 that is generated as output in response to receiving a feature vector 1100 as input.

Figure 18:
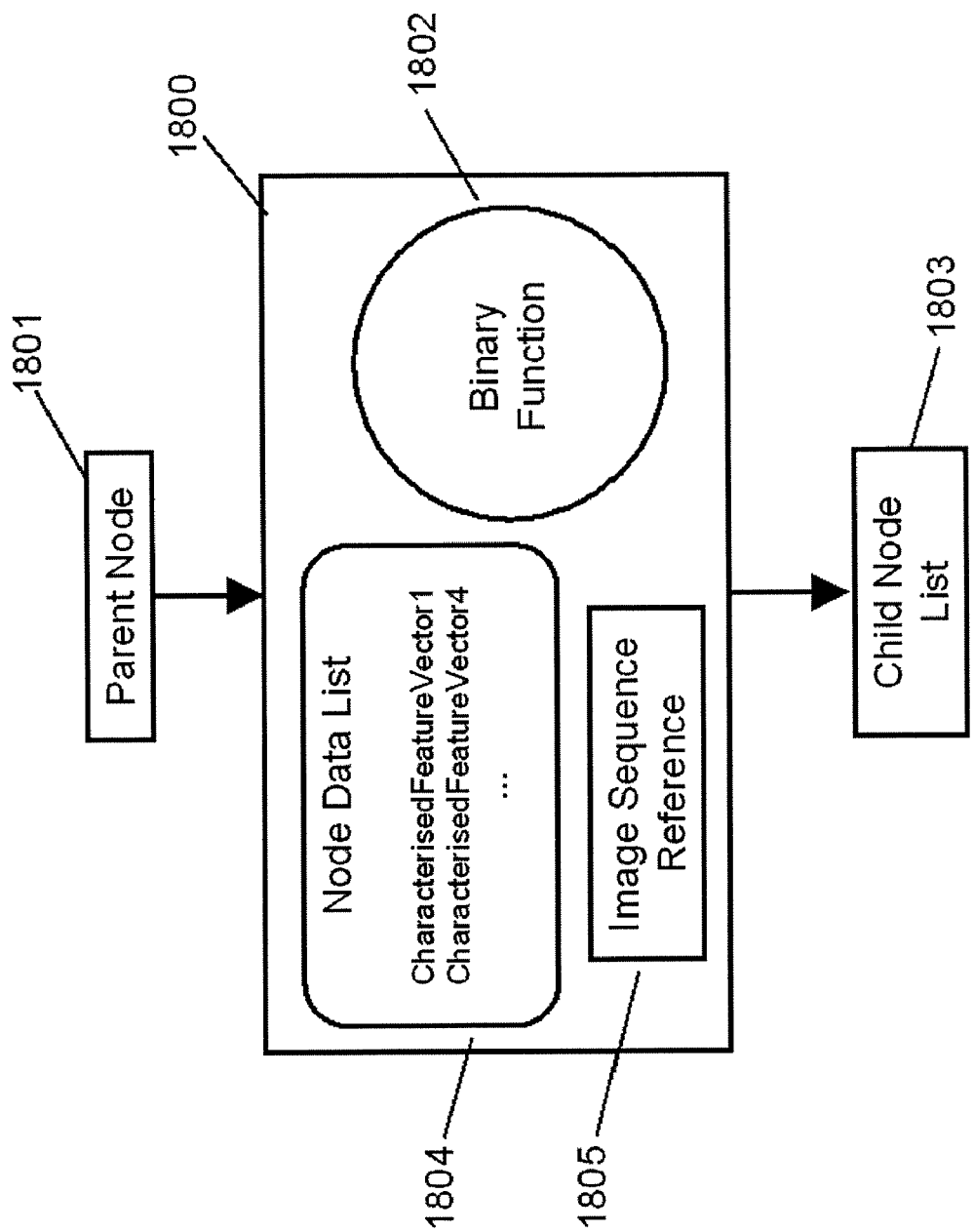
FIG. 18 is a schematic representation of an example of components of an incremental exception learner node.
Figure 19:
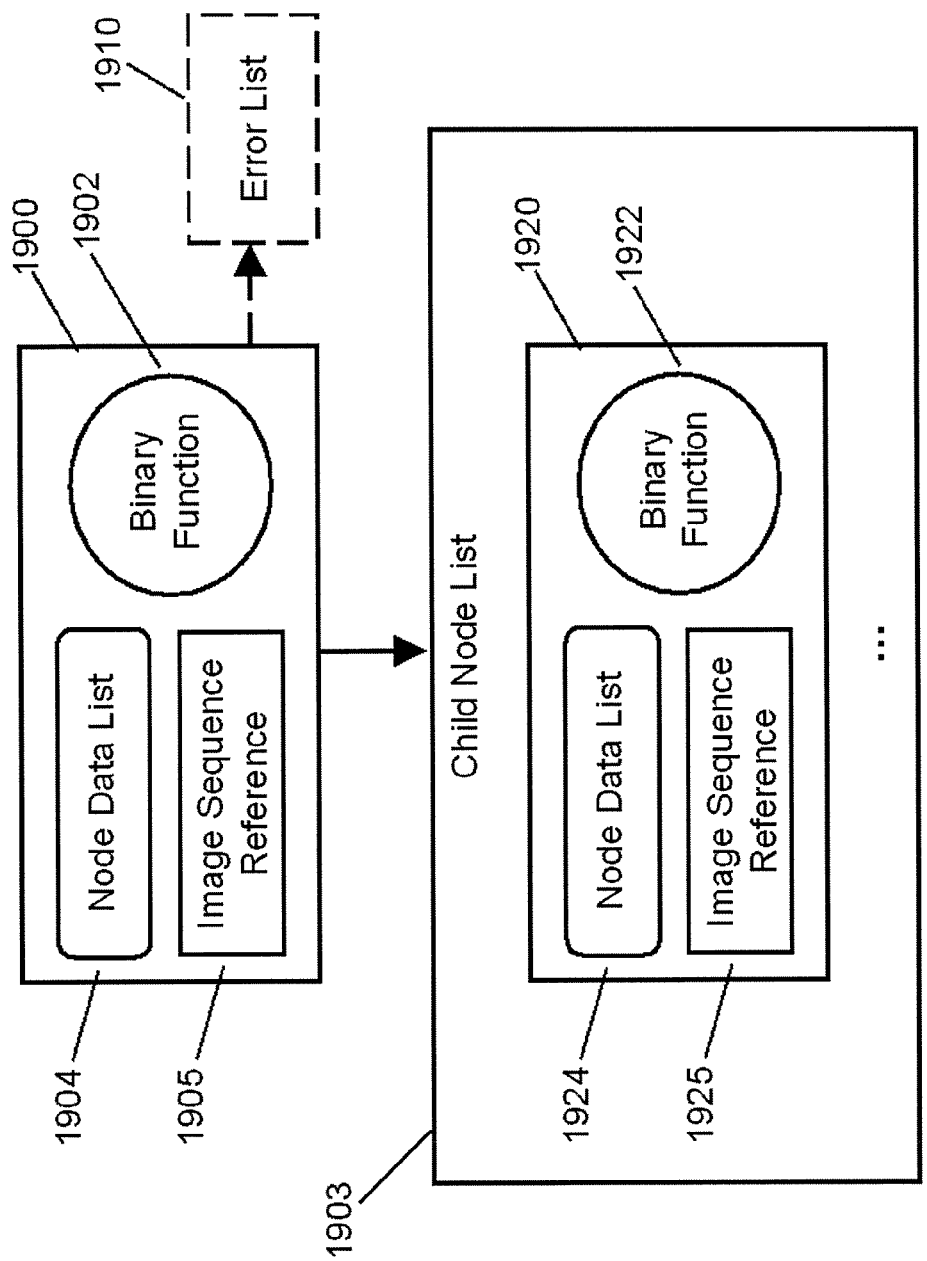
FIG. 19 is a schematic representation of an example of an erroneous node, and a new child node that is added as correction.

The IEL tree 1702 is a rooted, ordered tree of nodes of the form shown in FIG. 18. The functional components of a node 1800 are a parent node 1801, a binary function 1802, a child node list 1803, a node data list 1804, and an image sequence reference 1805. The node data list 1804 is a sub list of the user characterised feature vector list 1510, where the content of the node data list 1804 is determined by a process described below.

The term "node label" refers to the value of the category feature 1201 of the characterised feature vector 1200 and elements of the node data list 1504 of the node 1800. The parent node 1801 is not present if the node 1800 is the root node of the IEL tree 1702, and is present otherwise.

The binary function 1802 is a function that takes a feature vector 1100 as input, and outputs either the node label of the parent node 1801, or the node label of the node 1800. In the case of the root node, the binary function 1802 will always output the node label of the node 1800. Each node 1800 has a child node list 1803, which contains zero or more child nodes. The image sequence reference 1805 is a reference to an image sequence that was selected by the user by means of the first user interface 1700.

A node 1800 is said to "fire" on an input feature vector 1100 if the binary function 1802 returns the node label of the node 1800, rather than the node label of the parent node 1801. A root node will always fire on an input feature vector 1100.

An example of the process by which the IEL tree 1702 produces a characterisation label as an output, given a feature vector 1100 as input, will now be described. The feature vector 1100 is initially passed to the root node of the IEL tree. A depth-first search is performed on firing nodes in the IEL tree 1702, and concludes at the discovery of a firing node that has no firing child node. During the search, sibling nodes are tested in the order in which they were added to the IEL tree 1702. We refer to the first firing node that has no firing child node as the "conclusion" node. The value of the characterisation label output by the IEL tree 1702 is the value of the node label of the conclusion node.

An example of the process by which nodes are added to the IEL tree 1702 will now be described. The first user characterised feature vector list 1510 received as input to the IEL algorithm 1701 will result in the generation of an IEL tree 1702 that consists of a single root node. The node data list of the root node is a direct copy of the first user characterised feature vector list 1510. The binary function of the root node will always output the node label of the root node regardless of input. The child node list of the root node is initially empty.

The image sequence reference of the root node is a reference to the image sequence from which the characterised feature vector list 1510 was derived.

A subsequent user characterised feature vector list 1510 received as input may result in the addition of further nodes to the IEL tree 1702. In this case, for each node in the IEL tree 1702, a temporary data structure known as an "error list" is created, and is associated with the node. Following this, for each characterised feature vector 1200 within the user characterised feature vector list 1510, the value of the characterisation label output by the IEL tree 1702 is compared to the value of the category feature 1201 of the characterised feature vector 1200.

If the value of the characterisation label is not equal to the value of the category feature 1201, the characterised feature vector 1200 is added to the error list associated with the conclusion node. Once each characterised feature vector 1200 within the user characterised feature vector list 1510 has been processed as described, nodes in the IEL tree 1702 whose associated error list contains more than a threshold number of characterised feature vectors, are identified. Such nodes are referred to as "erroneous nodes", and the threshold number is preferably one. For each erroneous node in the IEL tree 1702, a new child node is added to the erroneous node.

The addition of a new child node 1920 to the child node list 1903 of an erroneous node 1900 will now be described with respect to FIG. 19.

In this example, the child node list of the new child node 1920 is initially empty. The image sequence reference 1925 of the new child node 1920 is a reference to the image sequence from which the characterised feature vector list 1510 was derived. The error list 1920 of the erroneous node 1900 is used as the node data list 1924 of the new child node 1920.

The binary function 1922 of the new child node 1920 is generated by training a machine learning algorithm. To achieve this, the training set of the machine learning algorithm contains all characterised feature vectors of the node data list 1924 of the new child node 1920, and the subset of characterised feature vectors of the node data list 1904 of the erroneous node 1900 that are correctly classified by the binary function 1902 of the erroneous node 1900. The category feature of a characterised feature vector is employed as the class attribute by the machine learning algorithm. The weight of misclassification is set to a value of one for all characterised feature vectors in the training set. As mentioned above, the machine learning algorithm is typically the c4.5 algorithm, but could alternatively be another machine learning algorithm that can incorporate instance weight information such as a feed forward neural network algorithm.

Once this has been completed, the binary function 1922 of the new child node 1920 is said to "correctly classify" a characterised feature vector received as input, if the output of the binary function 1922 is equal to the value of the category feature of the characterised feature vector.

If the generated binary function 1922 of the new child node 1920 cannot correctly classify each characterised feature vector in its training set, then it is deemed inconsistent. This corresponds to the determination of inconsistency at step 345.

Figure 20:
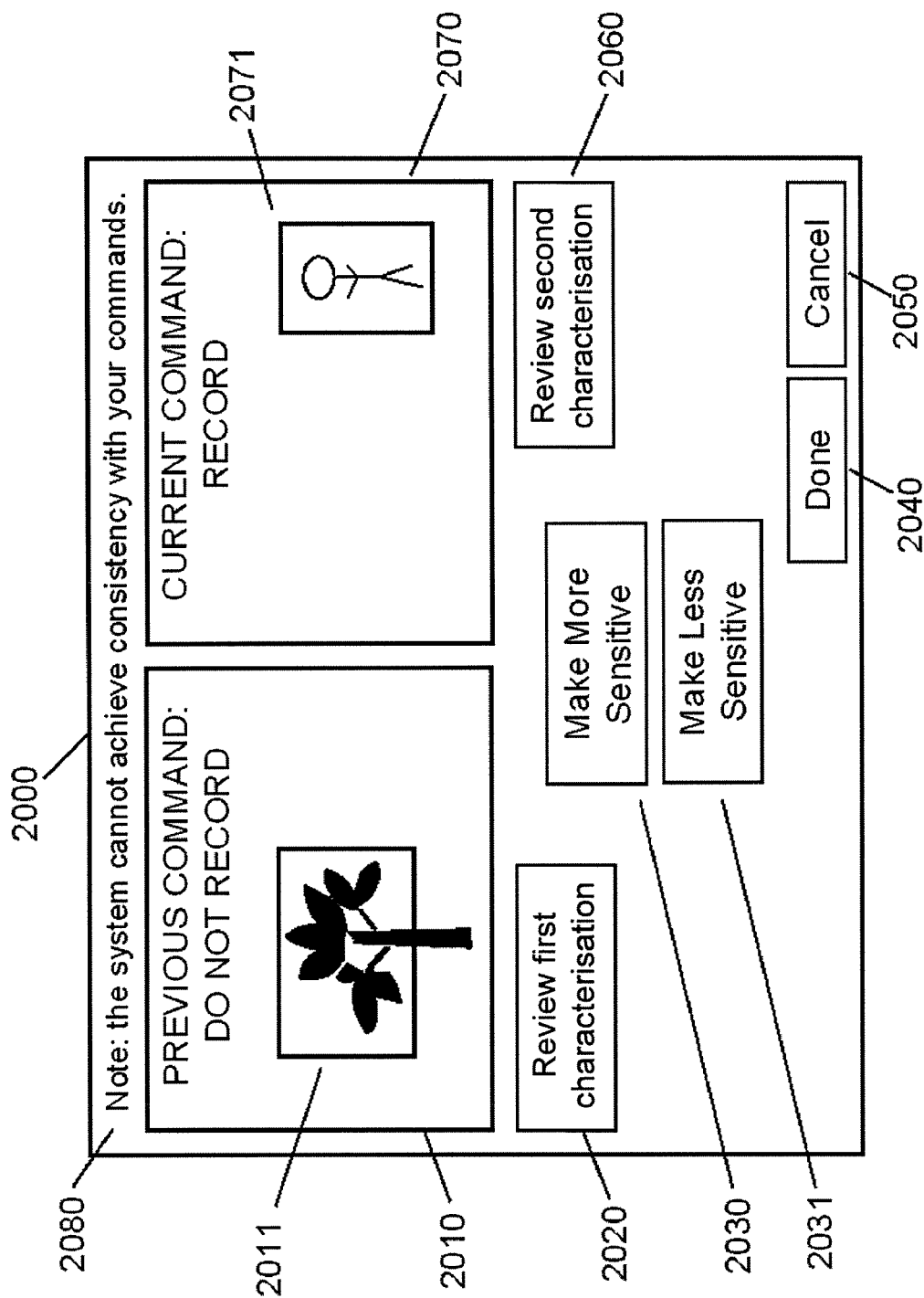
FIG. 20 is a schematic representation of a third example of a graphical user interface; and, FIGS. 21A and 21B are schematic representations of a fourth example of a graphical user interface including a time line.

If this occurs, a third GUI 2000, shown in FIG. 20, can be presented to the user at step 355 to allow adjustment to be performed.

In this example, the GUI 2000 includes a previous command video display area 2010, a review first characterisation button 2020, an increase sensitivity button 2030, a decrease sensitivity button 2031, an operation complete button 2040, a cancel operation button 2050, a current command video display area 2070, a review second characterisation button 2060, and a system message 2080, which provides the user with instructions.

If the binary function 1922 of the new child node 1920 does not correctly classify at least one characterised feature vector within the node data list 1904 of the erroneous node 1900, then selection of the review first characterisation button 2020, causes the image sequence referenced by the image sequence reference 1905 of the erroneous node 1900 to be displayed within the previous command video display area 2010.

Furthermore, for each characterised feature vector within the erroneous node data list 1904 that the binary function 1922 does not correctly classify, a displayed labelled region 2001 is displayed within the previous command video display area 2010. The size and location of the displayed labelled region 2001 is specified by the region described by the characterised feature vector. The time at which the displayed labelled region 2001 is displayed is specified by the timestamp of the characterised feature vector.

Alternatively, or additionally, selection of the show first characterisation button 2020 can cause a labelled region to be displayed for every characterised feature vector within the erroneous node data list 1904, rather than just the characterised feature vector(s) that are not correctly classifier by binary function 1922.

In one example, the GUI 2000 is only presented in the case that an inconsistency is determined, however, alternatively, the GUI 2000 can be presented to allow review of the characterisations.

In any event, if a user presses the review second characterisation button 2060, the image sequence referenced by the image sequence reference 1925 of the new child node 1920 is displayed within the current command video display area 2070 at step 355. Furthermore, for each characterised feature vector within the node data list 1924 that the binary function 1922 does not correctly classify, a displayed labelled region 2071 is displayed within the current command video display area 2070.

Alternatively, or additionally, a displayed labelled region can be displayed for every characterised feature vector within the node data list 1924, rather than just the characterised feature vector(s) that are not correctly classifier by binary function 1922.

When the GUI 2000 is first displayed, the value of a weight parameter is initialised with a value of zero. If the user 1410 presses the increase sensitivity button 2030, the value of the weight parameter is increased by a predetermined a value, such as one. If the user 1410 presses the decrease sensitivity button 2031, the value of the weight parameter undergoes a corresponding decrease.

As a result of pressing the increase sensitivity button 2030, or the decrease sensitivity button 2031, the binary function 1922 of the new child node 1920 is replaced with a new binary function as part of step 365.

To achieve this, a training set is prepared as described above. In this case however, if the value of the weight parameter is positive, the value of the weight of each characterised feature vector within the training set whose category feature is "record" is increased by the value of the weight parameter. If the value of the weight parameter is negative, the value of the weight of each characterised feature vector within the training set whose category feature is "do not record" is increased by the absolute value of the weight parameter. The binary function 1922 of the new child node 1920 is replaced with a binary function generated by a machine learning algorithm that is trained on this training set.

Alternatively, if the increase sensitivity button 2030 is selected, the value of the weight of each characterised feature vector within the training set whose category feature is "record" can be iteratively increased. In one example, this is repeated until the resulting trained binary function 1922 classifies correctly all of the characterised feature vector within the training set whose category feature is "record". Similarly, if the decrease sensitivity button 2031 is selected, the value of the weight of each characterised feature vector within the training set whose category feature is "do not record" is iteratively increased. Again, in one example, this is repeated until the resulting trained binary function 1922 classifies correctly all of the characterised feature vector within the training set whose category feature is "do not record".

As a result of replacing the binary function 1922 of the new child node 1920, a different collection of displayed labelled regions may be displayed within the previous command video display area 2010 and the current command video display area 2070 according to the behaviour of the new binary function 1922.

Thus, the effect of the user's modification is displayed at step 365, allowing the user to repeat the modification process if the result is unacceptable.

During this process, the cancel operation button 2050 can be selected, and new node is removed from the IEL tree 1402, and the GUI 2000 is closed, thereby effectively removing the effect of the indication provided by the user at steps 325 or 340.

Once the modification is deemed acceptable at step 370, the operation complete button 2040 can be selected, with the new node remaining as part of the IEL tree 1702. The GUI 2000 is then closed.

If multiple new nodes were added to the IEL tree 1702 as a result of the user characterised feature vector list 1510 that was received as input by the configurable motion thread characteriser 550, the GUI 2000 may be displayed, otherwise the GUI 1300 is displayed.

A fourth example of a graphical user interface will now be described with reference to FIGS. 21A and 21B. In this example, the GUI allows inconsistencies to be addressed using a timeline, which is capable of displaying a location of inconsistencies within video sequences.

In this example, the GUI 2100 includes first and second video windows 2101, 2102, for displaying respective first and second video sequences. Each video window has an associated timeline 2103, 2104, and an optional associated slider 2105, 2106, which can be used for controlling the display of the video sequences. Additionally input buttons 2107, 2108 are provided to allow the user to provide inputs for altering the model configuration, as will be described in more detail below.

In use, when inconsistencies are determined by the computer system 200, the computer system 200 will select two video sequences including inconsistencies, and cause these to be displayed within the video windows 2101, 2102. The timelines 2103, 2104 represent the duration of the video, and include indicators, shown generally at 2110, 2111, 2112, which highlight the temporal location at which inconsistencies in characterisation have occurred.

In one example, the video sequences selected may be the same video sequence, with each of the timelines being used to highlight the location of a different inconsistency. Thus, the timeline 2103 can be used to identify false negatives, whilst the timeline 2104 can be used to identify false positives. Alternatively the video windows 2101, 2102 may be used to display different video sequences, depending on the preferred implementation, in which case the indicators 2110, 2111, 2112 may be used to indicate both the location and the nature of the inconsistency.

This allows the user to navigate to locations within the video sequences, using the timelines 2103, 2104, and review the inconsistencies. In, one example this can be achieved for example by clicking on the displayed inconsistency 2110, 2111, 2112, using a pointing device such as a mouse or the like, with the corresponding inconsistency then being displayed in the corresponding video window 2101, 2102. Alternatively, the user can use the sliders 2105, 2106 to navigate to respective temporal locations within the video sequences, for example, using a suitable input device, such as a mouse or other pointing device.

Once a respective location has been selected using one of the sliders 2105, 2106, or using the timelines 2103, 2104, the video frame at that respective location are displayed in the corresponding video windows 2101, 2102, allowing the user to review the inconsistency.

Following this the user can then utilise the controls 2107, 2108 to adjust the model configuration. This can be achieved in any one of a number of manners.

In one example, the controls 2107, 2108 can be used to increase or decrease the sensitivity to motion, in a manner similar to that described above with respect to the increase and decrease sensitivity buttons 2030, 2031.

Alternatively, the controls 2107, 2108 can be used to indicate a preference for characterisation as per the video sequences shown in the video windows 2101, 2102. This allows the user to manipulate the video sequences to display different example characterisations in the video windows 2101, 2102, with the controls 2107, 2108 being used to update the model to be more similar to a selected one of the example characterisations. Thus, for example, the video window 2101 can display a false negative, whilst the video window 2102 displays a false positive. The user can then select the control 2107 if they wish to adapt the model to generate more false negatives (and hence less false positives), or the control 2108 if they wish for the model to generate more false positives (and hence less false negatives).

It will be appreciated from this that whilst the first and second video sequences displayed in the first and second video windows 2101, 2102 could be different sequences, alternatively the same sequence could be displayed, with the user selecting a different temporal location in the video sequence as an example for updating the machine learning model.

Once an appropriate selection has been made by the user, using the controls 2107, 2108, the machine learning model will be updated, as previously described. The user interface 2100 can then be updated, as shown in FIG. 21B, to provide examples of new inconsistencies. Thus, as shown in this example, the inconsistencies 2110, 2111, 2112 are replaced by the inconsistencies 2120, 2121, 2122.

Accordingly, this allows the user to assess whether the change affected using the controls 2107, 2108 has resulted in improvement of the model and in particular reduced the number of inconsistencies, or made the inconsistencies more appropriate for the particular application. This allows the user to readily assess the affect of changes in the model allowing the user to more appropriately update the model.

In any event, it will be appreciated that the above described process allows machine learning systems to be configured by a user.

In one example, this is achieved by allowing a user to identify, and subsequently correct errors in characterisation. For example, in the case of characterising a motion thread forming part of a video sequence, as being "interesting" when the user desires that the motion thread is deemed "not interesting", the user can provide an indication of the desired output. In the event, that such a correction is inconsistent with previous indications, this is highlighted to the user, allowing the user to adjust the training of the machine learning system in an appropriate manner.

In general, the term portion refers to any part of a video sequence, and can include a spatial region within the frames of the video sequence, or a segment formed from a limited number of frames of the video sequence, or a spatial region within a limited number of frames of the video sequence.

The term processing system is understood to encompass the computer system 200, as well as any other suitable processing system, such as a set-top box, PDA, mobile phone, or the like.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method for configuring a model for use in a motion characterisation process, wherein the method comprises, in a processing system:
   a) acquiring user characterisations for respective portions of at least one video sequence;
   b) configuring the model using the user characterisations and at least one property associated with the respective portions;
   c) determining an inconsistency in the user characterisations using the model;
   d) displaying an indication of the inconsistency;
   e) determining a selected at least one option for addressing the inconsistency in accordance with user input commands; and,
   f) reconfiguring the model based on the selected at least one option.

2. A method according to claim 1, wherein the portions comprise spatiotemporal regions in frame sequences in the at least one video sequence.

3. A method according to claim 1, wherein the method comprises, in the processing system:
   a) causing at least a portion of the at least one video sequence to be displayed to a user;
   b) determining a region of the at least one video sequence designated by the user;
   c) determining an adjustment factor designated by the user; and,
   d) determining the user characterisations using the user designated region and the adjustment factor.

4. A method according to claim 1, wherein the method comprises, in the processing system:
   a) configuring the model using the user characterisations;
   b) determining a characterisation for at least one region within at least one user designated region using the model;
   c) comparing the determined characterisation to the user characterisations for the at least one user designated region; and,
   d) determining an inconsistency based on the result of the comparison.

5. A method according to claim 1, wherein the method comprises, in the processing system:
   a) causing an indication of one or more options for addressing the inconsistency to be displayed; and,
   b) selecting at least one of the options in accordance with user input commands.

6. A method according to claim 1, wherein the method comprises; in the processing system, causing the characterisation of a region to be displayed by at least one of:
   a) indicating an extent of a characterised region using a polygon; and,
   b) indicating the characterisation using at least one of:
      i) a colour associated with a polygon indicating a region extent; and,
      ii) a label.

7. A method according to claims 1, wherein the method comprises, in the processing system:
   a) causing at least one portion of the at least one video sequence to be displayed to a user;
   b) for one or more regions of the at least one video sequence, displaying a characterisation; and,
   c) determining a user characterisation in response to user input commands.

8. A method according to claim 1, wherein the method comprises; in the processing system:
   a) causing an adjustment indicator to be displayed together with at least one portion of the at least one video sequence; and,
   b) determining a user characterisation at least in part based on an adjustment factor determined based on designation of the adjustment indicator by the user.

9. A method according to claim 1, wherein the method comprises, in the processing system, determining at least one of the size, shape, position and user characterisation of a user designated region in accordance with user input commands.

10. A method according to claim 1, wherein the method comprises, in the processing system, tracking movement of a user designated region across a number of frames in the at least one video sequence in accordance with user input commands.

11. A method according to claim 1, wherein the method comprises, in the processing system, causing an indication of the inconsistency to be displayed by:
   a) determining a number of instances in which user characterisation of motion is not correctly characterised using the configured model; and,
   b) causing the number to be displayed.

12. A method according to claim 1, wherein the method comprises, in the processing system, determining an inconsistency if the model does not correctly characterise motion characterised by a user characterisation.

13. A method according to claim 12, wherein the method comprises, in the processing system, addressing an inconsistency using at least one of:
   a) a further user characterisation;
   b) cancellation of a configuration of the model; and,
   c) an indication of an adjustment factor.

14. A method according to claim 13, wherein the model is used to characterise video sequences, and wherein user characterisations are used to modify the motion characteriser to thereby more accurately characterise video sequences.

15. A method according to claim 14, wherein the method comprises, in the processing system, using the user characterisations to adjust a motion detection sensitivity.

16. A method according to claim 15, wherein the method comprises, in the processing system:
   a) for at least one region of at least one video sequence, determining a motion thread;
   b) using the motion thread to determine a feature vector; and,
   c) characterising at least a portion of at least one video sequence using the feature vector.

17. A method according to claim 16, wherein the method further comprises, in the processing system:
   a) determining a value of a sensitivity parameter; and,
   b) utilising the value of the sensitivity parameter to configure a motion characteriser.

18. A method according to claim 17, wherein the respective portions are formed from at least one of:
   a) respective segments of at least one video sequence;
   b) respective regions within a segment of at least one video sequence;
   c) respective segments of different video sequences; and,
   d) respective regions within segments of different video sequences.

19. A method according to claim 1, wherein the method includes, in the processing system, displaying the inconsistency using a timeline.

20. A method according to claim 19, wherein the method includes, in the processing system:
   a) displaying the timeline representing at least one video sequence; and,
   b) displaying at least one indicator on the timeline, the indicator representing the temporal location of an inconsistency within the at least one video sequence.

21. Apparatus for configuring a model for use in a motion characterisation process, wherein the apparatus comprises a processing system for:
   a) acquiring user characterisations for respective regions of at least one video sequence;
   b) configuring the model using the user characterisations and at least one property associated with the respective portions;
   c) determining an inconsistency in the user characterisations using the model;
   d) displaying an indication of the inconsistency;
   e) determining a selected at least one option for fixing the inconsistency in accordance with user input commands; and,
   f) reconfiguring the model based on the selected at least one option.

22. A non-transitory computer-readable medium for configuring a model for use in a motion characterisation process, the non-transitory computer-readable medium including computer executable code which when executed on a suitable processing system causes the processing system to:
   a) acquire user characterisations for respective regions of at least one video sequence;
   b) configure the model using the user characterisations and at least one property associated with the respective regions;
   c) determine an inconsistency in the user characterisations using the model;
   d) display an indication of the inconsistency;
   e) determine a selected at least one option for fixing the inconsistency in accordance with user input commands; and,
   f) reconfigure the model based on the selected at least one option.

* * * * *